US012792951B2

(12) United States Patent
Arumugam et al.

(10) Patent No.: US 12,792,951 B2
(45) Date of Patent: Nov. 10, 2026

(54) CHANGE PREDICTION PLATFORM USING QUANTUM NEURAL NETWORKS AND CHANGE SCHEMA

(71) Applicant: Bank of America Corporation, Charlotte, NC (US)

(72) Inventors: Rajalakshmi Arumugam, Chennai (IN); Abhilasha Singh, Gurgaon (IN); Ramya Sivaramakrishnan, Chennai (IN); Deepika Sehgal, Gurugram (IN); Ekta Sood Lamba, Gurgaon (IN)

(73) Assignee: Bank of America Corporation, Charlotte, NC (US)

(*) Notice: Subject to any disclaimer, the term of this patent is extended or adjusted under 35 U.S.C. 154(b) by 539 days.

(21) Appl. No.: 18/371,918

(22) Filed: Sep. 22, 2023

(65) Prior Publication Data

US 2025/0103937 A1 Mar. 27, 2025

(51) Int. Cl.
*G06N 10/60* (2022.01)
*G06F 40/40* (2020.01)

(52) U.S. Cl.
CPC ............. *G06N 10/60* (2022.01); *G06F 40/40* (2020.01)

(58) Field of Classification Search
CPC ................................ G06F 40/40; G06N 20/00
See application file for complete search history.

(56) References Cited

U.S. PATENT DOCUMENTS

| | | | |
|---|---|---|---|
| 10,979,399 B2 | 4/2021 | Shepard et al. | |
| 11,157,585 B2 | 10/2021 | Lin et al. | |
| 11,301,869 B2 | 4/2022 | Cueli et al. | |
| 11,403,276 B2 | 8/2022 | Xu | |
| 11,422,221 B2 | 8/2022 | de la Broise et al. | |
| 11,436,583 B2 | 9/2022 | Modi et al. | |
| 11,533,175 B1 * | 12/2022 | Rao | G06F 9/45558 |
| 11,551,127 B1 | 1/2023 | Otterbach et al. | |
| 12,407,562 B1 * | 9/2025 | Raj | H04L 41/16 |
| 12,488,273 B2 * | 12/2025 | Le Van Gong | G06N 10/60 |
| 12,500,921 B2 * | 12/2025 | Rao | H04L 63/1416 |
| 2008/0109500 A1 * | 5/2008 | Macready | G06N 10/20 708/2 |
| 2017/0024743 A1 | 1/2017 | Fogel et al. | |
| 2021/0342730 A1 | 11/2021 | Redmond et al. | |
| 2022/0123849 A1 | 4/2022 | McCall et al. | |
| 2022/0124543 A1 | 4/2022 | Orhan et al. | |
| 2022/0197773 A1 | 6/2022 | Butler et al. | |
| 2022/0343250 A1 | 10/2022 | Tremblay et al. | |

(Continued)

*Primary Examiner* — Barbara M Level
(74) *Attorney, Agent, or Firm* — Banner & Witcoff, Ltd.

(57) ABSTRACT

Arrangements for a change prediction model using a quantum neural network are provided. A platform may train a quantum change schema model. The platform may receive and process an event processing request and one or more change instructions. The platform may generate a change schema for the event processing request using the model and based on the one or more change instructions. The platform may cause processing of the change schema. The platform may update the model based on receiving results of processing the change schema. The platform may cause the event processing request to be processed based on the change schema. The platform may further update the model based on modified change instructions received as a result of processing the event processing request.

20 Claims, 15 Drawing Sheets

(56) References Cited

U.S. PATENT DOCUMENTS

| | | | | |
|---|---|---|---|---|
| 2022/0345417 | A1 | 10/2022 | Kasichainula et al. | |
| 2022/0366494 | A1 | 11/2022 | Cella et al. | |
| 2022/0400130 | A1 | 12/2022 | Kapoor et al. | |
| 2023/0123240 | A1 | 4/2023 | Baughman et al. | |
| 2023/0123322 | A1 | 4/2023 | Cella et al. | |
| 2023/0147890 | A1 * | 5/2023 | Cao | G06N 7/01<br>704/9 |
| 2023/0206329 | A1 | 6/2023 | Cella et al. | |
| 2023/0254330 | A1 | 8/2023 | Singh et al. | |
| 2023/0281503 | A1 * | 9/2023 | Singh | G06F 16/909<br>706/12 |
| 2023/0289340 | A1 | 9/2023 | Cella et al. | |
| 2024/0046144 | A1 * | 2/2024 | Ohm | G06F 16/2465 |
| 2024/0354750 | A1 * | 10/2024 | Almasan | G06Q 20/3823 |
| 2025/0103938 | A1 * | 3/2025 | Arumugam | G06N 20/00 |
| 2025/0315503 | A1 * | 10/2025 | Singh | G06N 10/00 |

* cited by examiner

CHANGE PREDICTION PLATFORM USING QUANTUM NEURAL NETWORKS AND CHANGE SCHEMA

BACKGROUND

Aspects of the disclosure relate to a change prediction platform for capturing missed change instructions using quantum neural networks. In some instances, a system may process a multitude of event processing requests in a given period of time. Change instructions related to modifications to pending or in-process event processing requests may affect the manner in which the event processing request is processed. Due to the volume of requests processing in a given period of time, some change instructions may be missed or overlooked (e.g., not applied to an event processing request, or applied to the wrong event processing request). Current systems may lack an efficient and accurate method of identifying change instructions that should be applied to event processing requests and ensuring the event processing requests are processed properly. Accordingly, it may be important to provide improved methods of predicting change instructions for event processing requests and ensuring all change instructions corresponding to an event processing request are applied during processing.

SUMMARY

Aspects of the disclosure provide effective, efficient, scalable, and convenient technical solutions that address and overcome the technical problems associated with applying change instructions to event processing requests in event processing systems. In accordance with one or more arrangements of the disclosure, a computing platform with at least one processor, a communication interface, and memory storing computer-readable instructions may retrieve a plurality of historical event processing requests and a plurality of historical change instructions from an event processing system. The computing platform may encode the plurality of historical event processing requests using quantum encoding. The computing platform may process the plurality of historical change instructions using natural language processing. The computing platform may train a quantum change schema model based on the encoded plurality of historical event processing requests and based on the processed plurality of historical change instructions. Training the quantum change schema model may configure the quantum change schema model to output change schema identifying one or more parameters for processing event processing requests. The computing platform may receive a first event processing request from a user device. The computing platform may encode the first event processing request using quantum encoding. The computing platform may receive one or more change instructions from the event processing system. The computing platform may process the one or more change instructions using natural language processing. The computing platform may generate a change schema for the first event processing request by inputting the encoded first event processing request and the processed one or more change instructions into the quantum change schema model. The change schema may identify one or more parameters for processing the first event processing request based on the one or more change instructions. The computing platform may cause a microservice system to process the change schema. Causing the microservice system to process the change schema may cause the microservice system to implement one or more changes to the first event processing request based on the change schema. The computing platform may receive one or more indications of results of processing the change schema. The computing platform may update the quantum change schema model based on the one or more indications. The computing platform may cause the event processing system to process the first event processing request based on the change schema for the first event processing request.

In one or more arrangements, the computing platform may determine whether the first event processing request is associated with a quantity of change instructions, of the one or more change instructions, that satisfies a threshold quantity of change instructions. The computing platform may make the determination based on inputting the encoded first event processing request and the one or more change instructions into the quantum change schema model. The computing platform may input the first event processing request into a quantum change prediction model based on determining that the first event processing request is associated with a quantity of change instructions that satisfies the threshold quantity of change instructions. The quantum change prediction model may be configured to output probability scores and sets of predicted change instructions for event processing requests. A given probability score may indicate a likelihood that a change instruction should be applied to a given event processing request. The computing platform may generate a set of predicted change instructions for the first event processing request based on inputting the first event processing request into the quantum change prediction model. The computing platform may input the set of predicted change instruction into the quantum change schema model prior to generating the change schema for the event processing request. Generating the change schema for the first event processing request may be based on inputting the set of predicted change instructions into the quantum change schema model.

In one or more examples, causing the microservice system to process the change schema may cause broadcasting of one or more notifications indicating the one or more parameters by the microservice system and to one or more devices associated with the event processing system. In one or more arrangements, encoding the first event processing request and encoding the plurality of historical event processing requests may each include encoding event processing information into one or more amplitudes of a quantum state.

In one or more arrangements, the one or more indications of results of processing the change schema may include user input associated with the change schema and providing instructions to update the quantum change schema model. In one or more examples, the computing platform may generate a notification based on causing the event processing system to process the first event processing request. The notification may include an indication that the first event processing request was processed and the one or more parameters, identified by the change schema, for processing the first event processing request. The computing platform may send the notification to the user device. The computing platform may receive one or more change instructions for one or more additional event processing requests based on sending the notification to the user device.

In one or more arrangements, the one or more parameters for processing the first event processing request may include one or more of: a timeframe for processing the first event processing request, a final destination for routing the first event processing request, an intermediary destination for routing the first event processing request, or an application for processing the first event processing request. In one or more examples, the one or more indications of the results of processing the change schema may include one or more of: an indication of whether an application identified by the change schema satisfies a parameter of the first event processing request, an indication of whether a destination, identified by the change schema, satisfies a parameter of the first event processing request, or an indication of whether a timeframe, identified by the change schema and for processing the first event processing request, satisfies a parameter of the first event processing request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
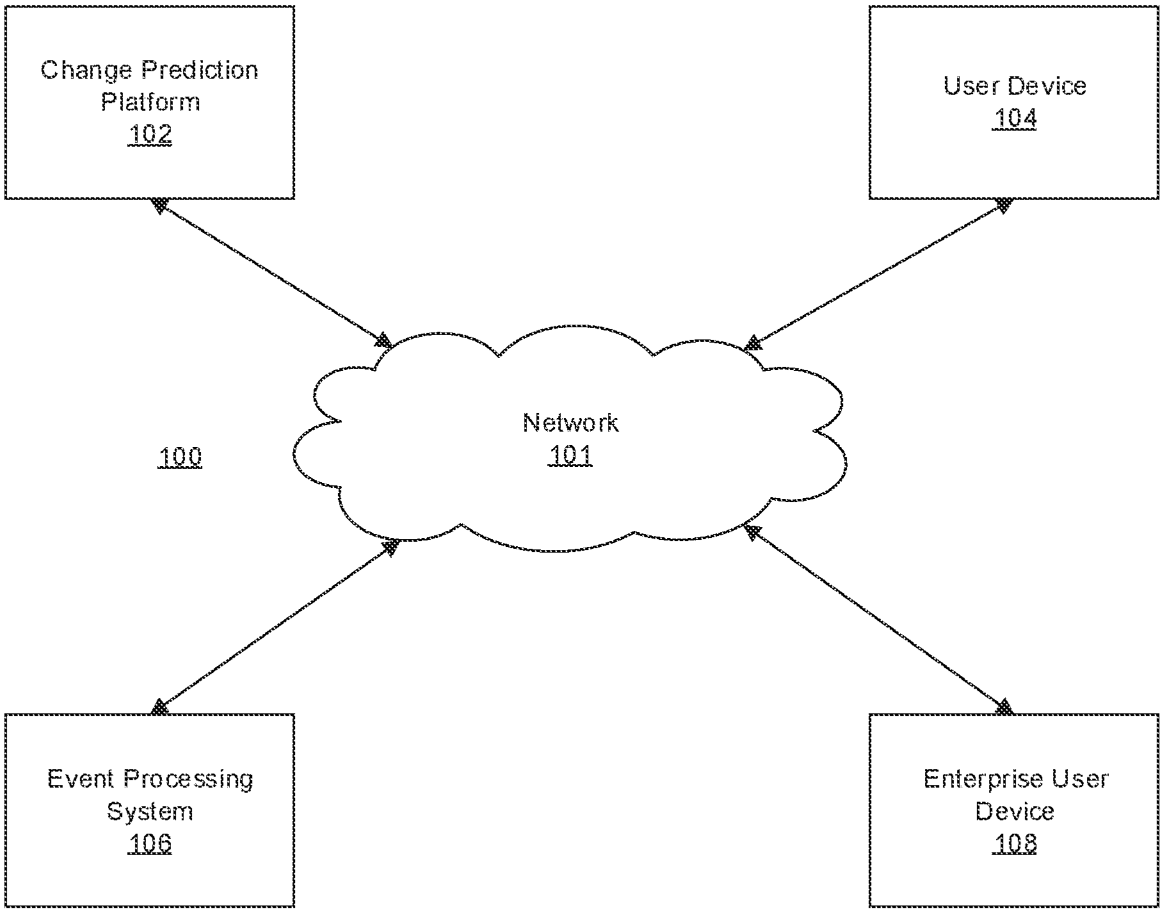
FIGS. 1A-1B depict an illustrative computing environment for a change prediction platform using quantum neural networks in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a change prediction platform using quantum neural networks.

Entities such as enterprise organizations (e.g., financial institutions, and/or other institutions) may utilize one or more systems that process various event processing requests (e.g., transferring assets between accounts managed by the enterprise organization, transmitting information related to an account managed by the enterprise organization, transferring assets into or out of an account managed by the enterprise organization, transferring assets from an account managed by the enterprise organization to a third party, and/or other event processing requests). In some instances, a system may process thousands or millions of event processing requests on a daily basis. Each of these event processing requests may pass through multiple layers (e.g., applications and/or processes) of the system before it is fully processed, during which time change instructions related to modifications to pending or in-process event processing requests may affect the manner in which the event processing request is processed. These change instructions may be received through various channels of communication to the system maintained by the enterprise organization.

However, in some instances, applications and/or individuals (e.g., employees) associated with the enterprise organization might not have a means by which to track and/or link particular change instructions received by the system to a corresponding event processing request, due to limitations in the system. In these instances, change instructions may be lost, overlooked, and/or applied to the wrong event processing request, which may lead to defects (e.g., processing the wrong event processing request, processing an event processing request with the wrong applications, routing an event processing request to an incorrect department, process, and/or individual, or the like). Thus, there exists a strong need to develop a system that efficiently and accurately tracks and links change instructions received by the system to the appropriate event processing requests, identifies any change instructions that may have been missed or lost for event processing requests, and notifies the appropriate individuals and/or applications of the change instructions that should be applied during processing of event processing requests. Because the enterprise systems utilized by the enterprise organization may include sensitive information and multiple systems operating in concert, it is also important that the solution be non-invasive to the normal operation of the enterprise systems.

Accordingly, in some instances, entities such as the enterprise organization and/or other organizations/institutions may employ a change prediction platform configured to predict a likelihood that a change instruction was missed for an event processing request and configured to identify an appropriate schema for processing event processing requests associated with particular change instructions. For example, the platform may use one or more quantum neural networks configured to output such schema and/or predictions. The platform may perform quantum processing and/or encoding on event processing requests and change instructions. In some instances, the platform may identify that no change instructions corresponding to a particular event processing request have been received. In these instances, the platform may generate a probability score indicating a likelihood that the event processing request should be associated with one or more change instructions and/or the platform may generate a set of one or more predicted change instructions to associate with the event processing request. Additionally or alternatively, in some examples the platform may generate a change schema (e.g., a plan and/or mapping of change instructions to apply to an event processing request, which may include, e.g., one or more applications to use in processing the event processing request, an identification of one or more departments and/or individuals to which the event processing request should be routed, a timeframe for processing the event processing request, and/or other information). Based on the set of predicted change instructions and/or the change schema, the platform may cause a micro-service-based broadcast system to broadcast notifications of the change instructions, corresponding to each event processing request, to one or more user devices (e.g., enterprise user devices corresponding to an employee of the enterprise organization, or the like). Accordingly, the platform may cause the event processing request to be processed using the predicted change instructions and/or in accordance with the change schema.

Institutions may employ the methods of implementing a change prediction platform described above via computing devices that utilize machine learning models (e.g., quantum neural networks, or the like). In some instances, a device such as a computing platform may train a plurality of machine learning models (e.g., a quantum change schema model, a quantum change prediction model, and/or other models). For example, in some instances, a quantum change schema model may be trained to associate event processing requests with received change instructions and generate an appropriate change schema for each event processing request inputted into the model. A quantum change prediction model may be trained to determine a probability score indicating a likelihood that an event processing request should be associated with and/or should have received one or more change instructions and, based on comparing the likelihood to a threshold score, generate a set of predicted change instructions for the event processing request. The quantum model approach and the methods described above may improve the efficiency and accuracy of processing event processing requests by reducing the number of change instructions lost or applied to the wrong event processing request and ensuring event processing requests are processed according to the proper parameters based on change instructions received by the system.

Figure 1B:
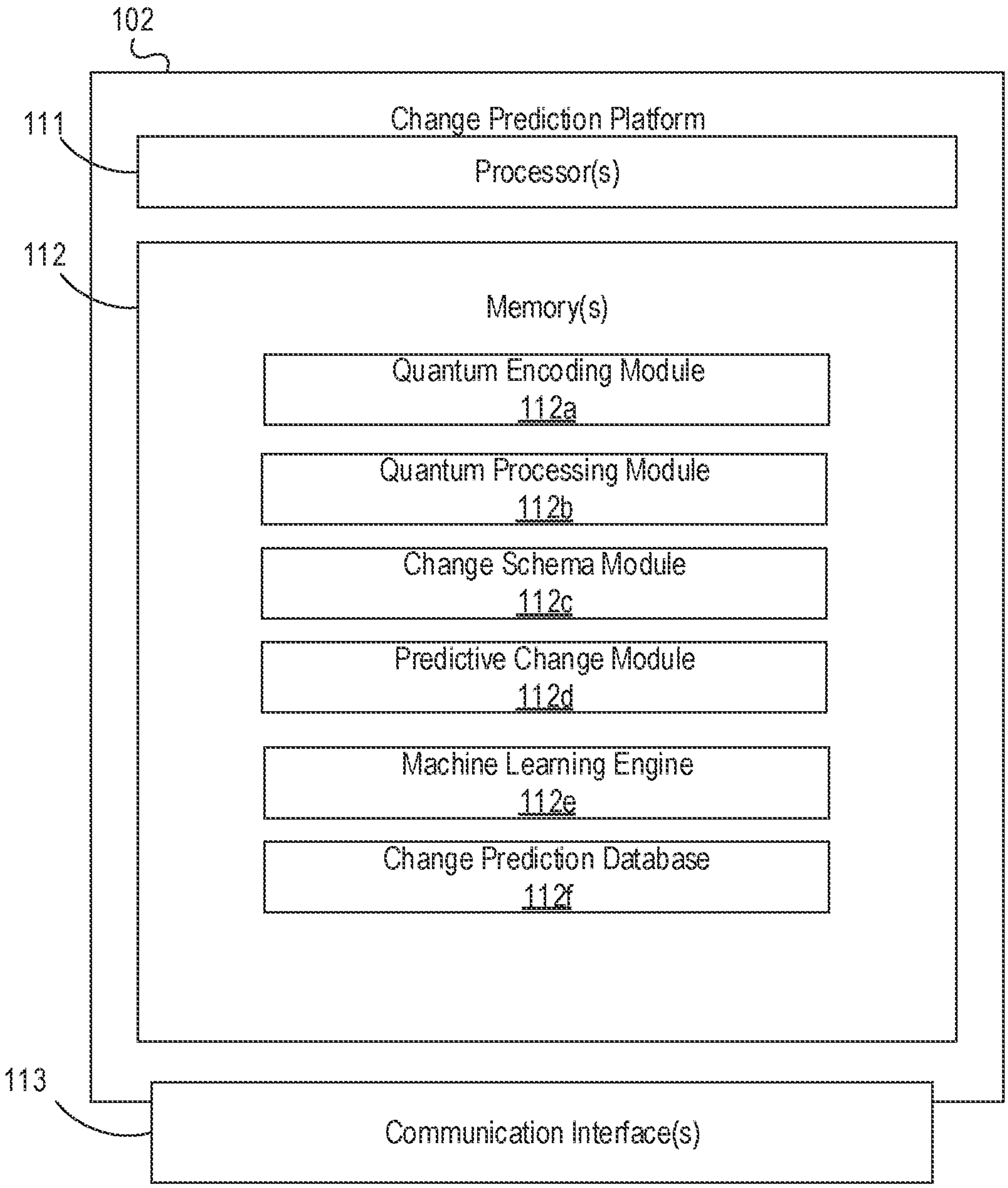

FIGS. 1A-1B depict an illustrative computing environment for a change prediction platform using quantum neural networks in accordance with one or more example arrangements. Referring to FIG. 1A, computing environment 100 may include one or more computer systems. For example, computing environment 100 may include a change prediction platform 102, a user device 104, an event processing system 106, and an enterprise user device 108.

As described further below, change prediction platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train and/or execute one or more machine learning models (e.g., quantum neural networks, such as a quantum change schema model, a quantum change prediction model, and/or other quantum neural networks). For example, the change prediction platform 102 may train the one or more machine learning models to generate change schema for event processing requests based on input of event processing requests (which may, e.g., be encoded using quantum encoding) and input of change instructions and/or sets of predicted change instructions (which may, e.g., be processed using quantum natural language processing (NLP)). Additionally or alternatively, in some instances, the change prediction platform 102 may train the one or more machine learning models to generate probability scores indicating a likelihood that one or more change instructions corresponding to an event processing request are awaiting identification based on input of an event processing request. Additionally or alternatively, in some examples, the change prediction platform 102 may train the one or more machine learning models to generate sets of predicted change instructions based on input of an event processing request. In some instances, the change prediction platform 102 may be further configured to monitor network traffic between one or more additional computing devices (e.g., user device 104, event processing system 106, enterprise user device 108, and/or other computing devices). In some examples, the change prediction platform 102 may be further configured to monitor applications and/or other methods of processing event processing requests at the one or more additional computing devices. In some instances, change prediction platform 102 may be controlled or otherwise maintained by an enterprise organization (e.g., a financial institution, and/or other institutions). In one or more examples, the change prediction platform 102 may be configured to communicate with one or more systems (e.g., user device 104, event processing system 106, and/or other systems) to perform an information transfer, display an interface, cause processing of an event processing request, send a notification, and/or perform other functions.

User device 104 may be a computing device (e.g., laptop computer, desktop computer, mobile device, tablet, smartphone, and/or other device) and/or other information storing or computing component (e.g., processors, memories, communication interfaces, databases) that may be used to transfer information between users and/or perform other user functions (e.g., sending an event processing request, displaying an alert, providing user input, and/or other functions). In one or more instances, user device 104 may correspond to a first user (who may, e.g., be client of the enterprise organization, such as a financial institution and/or other institution). In one or more instances, the user device 104 may be configured to communicate with one or more systems (e.g., change prediction platform 102, event processing system 106, and/or other systems) to perform an information transfer, display an alert, send and receive digital communications, and/or to perform other functions. In some instances, the user device 104 may be configured to display one or more graphical user interfaces (e.g., change instruction interfaces, and/or other interfaces). Although shown as a single user device, it should be understood that, in some instances, one or more additional user devices similar to user device 104 may be included in computing environment 100.

Event processing system 106 may be a system that comprises one or more computing devices (e.g., laptop computers, desktop computers, mobile devices, tablets, smartphones, servers, server blades, and/or other devices) and/or other information storing or computing component (e.g., processors, memories, communication interfaces, databases), similar to user device 104 and/or enterprise user device 108, that may be used to transfer information between users and/or perform other user functions (e.g., processing an event processing request, displaying an alert, and/or other functions). In one or more instances, the devices at event processing system 106 may correspond to users, such as a second user (who may, e.g., be an employee of the enterprise organization, such as a financial institution and/or other institution). In one or more instances, the event processing system 106 may be configured to communicate with one or more systems (e.g., change prediction platform 102, user device 104, and/or other systems) to perform an information transfer, send and receive digital communications, process event processing requests, display an alert, and/or to perform other functions. In some instances, the event processing system 106 may be configured to display one or more graphical user interfaces (e.g., change event alert interfaces, change schema interfaces, and/or other interfaces). In some instances, the event processing system 106 may include one or more subsystems or additional systems. For example, the event processing system 106 may include a microservice system (e.g., a microservice-based broadcast system) configured to broadcast notifications to one or more devices included in event processing system 106, process a change schema, and/or perform other functions. In some instances, the microservice system may separate one or more applications hosted, stored, and/or otherwise maintained by the event processing system 106 in order to perform tasks using the one or more applications separately (e.g., broadcasting notifications, processing change schema, and/or other tasks).

Enterprise user device 108 may be a computing device (e.g., laptop computer, desktop computer, mobile device, tablet, smartphone, and/or other device) and/or other information storing or computing component (e.g., processors, memories, communication interfaces, databases), similar to user device 104, that may be used to transfer information between users and/or perform other user functions (e.g., displaying an alert, providing user input, and/or other functions). In one or more instances, enterprise user device 108 may correspond to a third user (who may, e.g., be client of the enterprise organization, such as a financial institution and/or other institution). In one or more instances, the enterprise user device 108 may be coupled to and/or otherwise included in the event processing system 106 (e.g., as one of the one or more computing devices making up the 106) and the third user may be the second user described above with respect to the event processing system 106. In one or more instances, the enterprise user device 108 may be configured to communicate with one or more systems (e.g., change prediction platform 102, event processing system 106, and/or other systems) to perform an information transfer, display an alert, send and receive digital communications, and/or to perform other functions. In some instances, the enterprise user device 108 may be configured to display one or more graphical user interfaces (e.g., change event alert interfaces, change schema interfaces, and/or other interfaces). Although shown as a single user device, it should be understood that, in some instances, one or more additional user devices similar to enterprise user device 108 may be included in computing environment 100.

Computing environment 100 also may include one or more networks, which may interconnect change prediction platform 102, user device 104, event processing system 106, and enterprise user device 108. For example, computing environment 100 may include a network 101 (which may interconnect, e.g., change prediction platform 102, user device 104, event processing system 106, and enterprise user device 108). In some instances, the network 101 may include an event processing request transferred between one or more devices connected via the network 101.

In one or more arrangements, change prediction platform 102, user device 104, event processing system 106, and enterprise user device 108 may be any type of computing device capable of sending and/or receiving requests and processing the requests accordingly. For example, change prediction platform 102, user device 104, event processing system 106, enterprise user device 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of change prediction platform 102, user device 104, event processing system 106, and enterprise user device 108 may, in some instances, be special-purpose computing devices configured to perform specific functions.

Referring to FIG. 1B, change prediction platform 102 may include one or more processors 111, memory 112, and communication interface 113. An information bus may interconnect processor 111, memory 112, and communication interface 113. Communication interface 113 may be a network interface configured to support communication between change prediction platform 102 and one or more networks (e.g., network 101, or the like). Communication interface 113 may be communicatively coupled to the processor 111. Memory 112 may include one or more program modules having instructions that, when executed by processor 111, cause change prediction platform 102 to perform one or more functions described herein and/or one or more databases (e.g., a change prediction database **112*f*, or the like) that may store and/or otherwise maintain information which may be used by such program modules and/or processor 111. In some instances, the one or more program modules and/or databases may be stored by and/or maintained in different memory units of change prediction platform 102 and/or by different computing devices that may form and/or otherwise make up change prediction platform 102. For example, memory 112 may have, host, store, and/or include a quantum encoding module 112*a*, a quantum processing module 112*b*, a change schema module 112*c*, a predictive change module 112*d*, a machine learning engine 112*e*, a change prediction database 112*f***, and/or other modules and/or databases.

Quantum encoding module **112*a* may have instructions that direct and/or cause change prediction platform 102 to perform quantum encoding on one or more event processing requests. Quantum processing module 112*b* may have instructions that direct and/or cause change prediction platform 102 to process one or more change instructions using quantum natural language processing, and/or other quantum processing methods. Change schema module 112*c* may have instructions that direct and/or cause change prediction platform 102 to use a quantum change schema model to generate a change schema for an event processing request, determine whether change instructions are associated with an event processing request, and/or perform other change schema operations. Predictive change module 112*d* may have instructions that direct and/or cause change prediction platform 102 to generate use a quantum change prediction model to generate probability scores for event processing requests, generate sets of predicted change instructions, and/or perform other change prediction operations. Machine learning engine 112*e* may contain instructions causing change prediction platform 102 to train, implement, and/or update one or more machine learning models (e.g., quantum neural networks), such as a quantum change schema model, (that may, e.g., be used to generate change schema event processing requests), a quantum change prediction model (that may, e.g., be used to generate sets of predicted change instructions for event processing requests), and/or other models. In some instances, machine learning engine 112*e* may be used by change prediction platform 102 to refine and/or otherwise update methods for using quantum neural networks, and/or other methods described herein. Change prediction database 112*f* may have instructions causing change prediction platform 102** to store event processing requests, change instructions, and/or other information (that may, e.g., be used to generate change schema and/or sets of predicted change instructions using one or more machine learning models).

FIGS. 2A-2E depict an illustrative event sequence for a change prediction platform using quantum neural networks in accordance with one or more example arrangements.

Figure 2A:
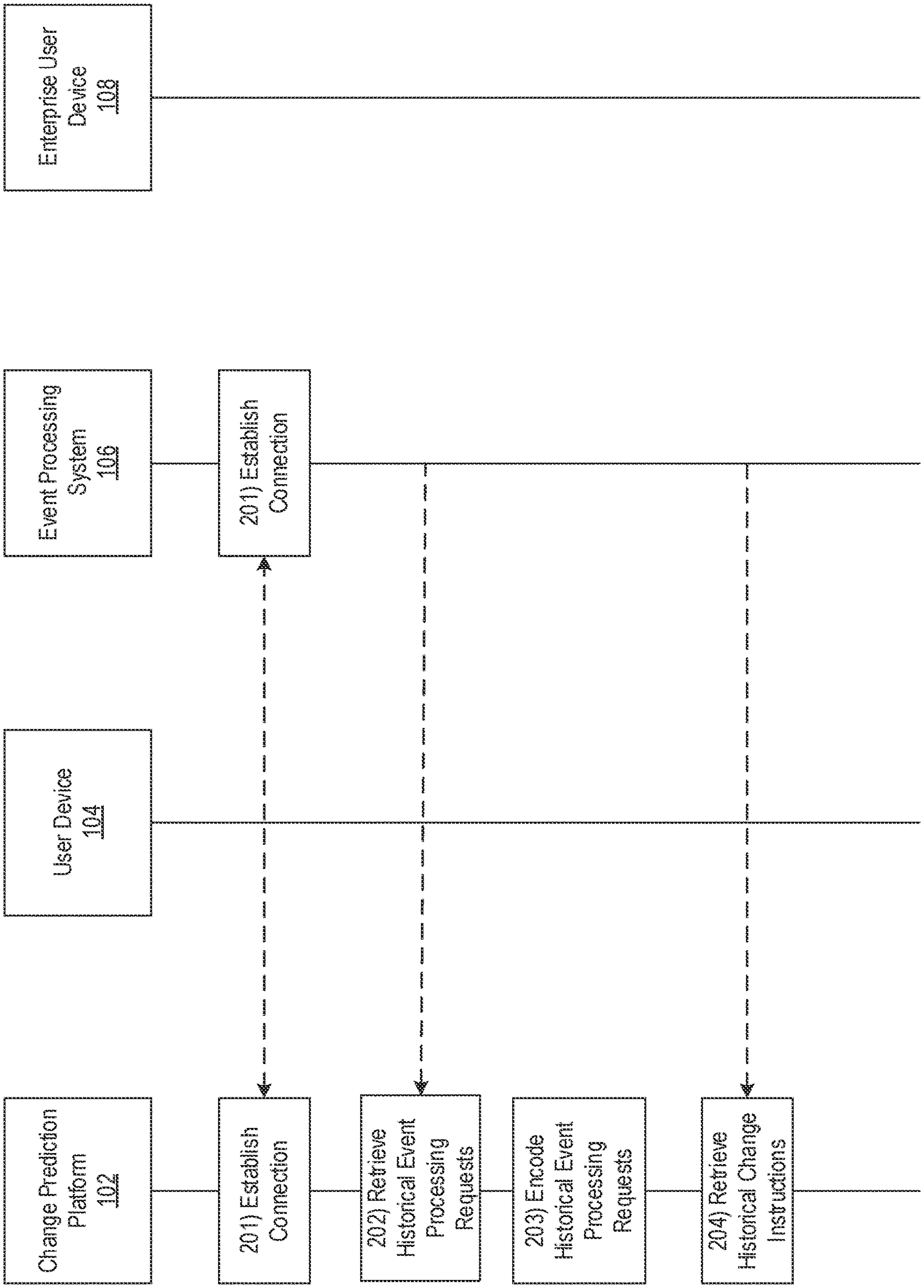
FIGS. 2A-2H depict an illustrative event sequence for a change prediction platform using quantum neural networks in accordance with one or more example arrangements.

Referring to FIG. 2A, at step 201, the change prediction platform 102 may establish a connection with the event processing system 106. For example, change prediction platform 102 may establish a first wireless data connection with the event processing system 106 to link the event processing system 106 with the change prediction platform 102 (e.g., in preparation for retrieving training data for one or more quantum neural networks, displaying an interface/alert, processing an event processing request, and/or other functions). In some instances, the change prediction platform 102 may identify whether or not a connection is already established with the event processing system 106. If a connection is already established with the event processing system 106, the change prediction platform 102 might not re-establish the connection. If a connection is not yet established with the event processing system 106, the change prediction platform 102 may establish the first wireless data connection as described above. In some examples, in establishing the connection with the event processing system 106, the change prediction platform 102 may establish the connection with a particular user device included in the event processing system 106.

At step 202, the change prediction platform 102 may retrieve a plurality of historical event processing requests from event processing system 106. For example, the change prediction platform 102 may send a request for the plurality of historical event processing requests to event processing system 106 via the communication interface 113 and while the first wireless data connection is established. In some instances, the historical event processing requests may include information associated with one or more maintained profiles (e.g., profiles of clients maintained by the enterprise organization associated with change prediction platform 102, and/or other profiles) and/or information related to processing the event processing requests. For example, each of the plurality of historical event processing requests may include information such as an average account balance associated with a profile, average numerical values associated with event processing requests, one or more destinations of the historical event processing requests, common third parties involved in previous event processing requests (e.g., commercial vendors, subscription-based services, or the like), sources of the historical event processing requests, timeframes associated with processing the event processing requests, indicators of one or more applications used for processing the historical event processing requests, a type of currency associated with an event processing request, and/or other information. In some examples, the change prediction platform 102 may store the retrieved plurality of historical event processing requests to memory (e.g., internal memory of the change prediction platform 102, such as memory 112, and/or external memory).

At step 203, the change prediction platform 102 may encode the plurality of historical event processing requests. In some examples, the change prediction platform 102 may encode the plurality of historical event processing requests using quantum encoding. In doing so, the change prediction platform 102 may configure the plurality of historical event processing requests to be used by a quantum neural network (e.g., a quantum change schema model, a quantum change prediction model, and/or other quantum neural networks). For instance, in encoding the plurality of historical event processing requests, the change prediction platform 102 may implement quantum amplitude encoding to encode one or more attributes of each historical event processing request into an amplitude of a quantum state. The one or more attributes may be select attributes captured from the information included in the historical event processing requests, such as an average account balance associated with a profile, average numerical values associated with event processing requests, one or more destinations of the historical event processing requests, common third parties involved in previous event processing requests (e.g., commercial vendors, subscription-based services, or the like), sources of the historical event processing requests, timeframes associated with processing the historical event processing requests, indicators of one or more applications used for processing the historical event processing requests, a type of currency associated with an event processing request, and/or other information. In implementing quantum amplitude encoding, the change prediction platform 102 may normalize the one or more select attributes as a vector and may, e.g., embed the vector in the amplitude of a quantum state.

At step 204, the change prediction platform 102 may retrieve a plurality of historical change instructions from the event processing system 106. For example, the change prediction platform 102 may send a request for the plurality of historical change instructions to event processing system 106 via the communication interface 113 and while the first wireless data connection is established. In some instances, the historical change instructions may include information associated with processing event processing requests. For example, the historical change instructions may each include one or more instructions directing a system to, e.g., modify a destination of an event processing request, modify a timeframe (e.g., by adding, removing, increasing, or decreasing the timeframe) associated with processing an event processing request, modify one or more numerical values (e.g., by increasing or decreasing the value) associated with the event processing request, modify one or more indications of applications (e.g., adding an indication or removing an indication) associated with processing the event processing request, and/or perform other modifications to the event processing request. In some examples, the change prediction platform 102 may store the retrieved plurality of historical change instructions to memory (e.g., internal memory of the change prediction platform 102, such as memory 112, and/or external memory).

Figure 2B:
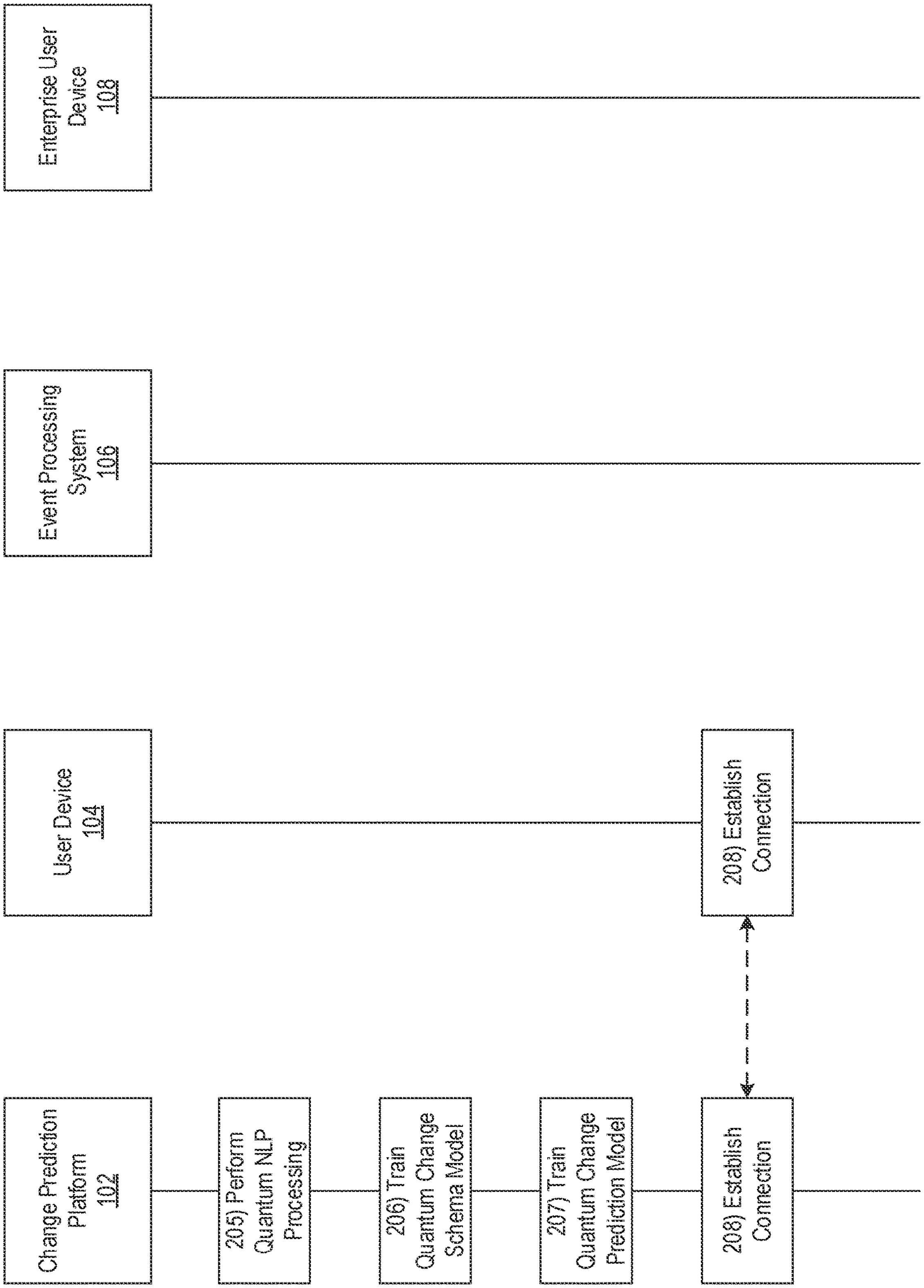

Referring to FIG. 2B, at step 205, the change prediction platform 102 may process the plurality of historical change instructions. In some instances, the change prediction platform 102 may process the plurality of historical change instructions using quantum natural language processing (NLP). In processing the plurality of historical change instructions using quantum NLP, the change prediction platform 102 may convert and/or configure the information included in the plurality of historical change instructions (e.g., one or more instructions directing a system to, e.g., modify a destination of an event processing request, modify a timeframe (e.g., by adding, removing, increasing, or decreasing the timeframe) associated with processing an event processing request, modify one or more numerical values (e.g., by increasing or decreasing the value) associated with the event processing request, modify one or more indications of applications (e.g., adding an indication or removing an indication) associated with processing the event processing request, and/or other modifications to the event processing request) into a format usable by a quantum neural network (e.g., a quantum change schema model, a quantum change prediction model, and/or other quantum neural networks). For instance, in processing the plurality of historical change instructions, the change prediction platform 102 may generate one or more word embeddings for each historical change instruction, where the word embeddings represent information included in the historical change instructions. The change prediction platform 102 may compute the word embeddings as quantum circuits that can be used by and/or with the quantum neural networks.

At step 206, the change prediction platform 102 may train a quantum change schema model. In some instances, the change prediction platform 102 may configure and/or otherwise train the quantum change schema model to generate change schema based on the plurality of historical event processing requests (which may, e.g., have been encoded as described above at step 203) and based on the plurality of historical change instructions (which may, e.g., have been processed as described above at step 205). In some instances, the plurality of historical change instructions and the plurality of historical event processing requests may be stored in internal memory of the change prediction platform 102, such as memory 112, and/or external memory. In some instances, to configure and/or otherwise train the quantum change schema model, the change prediction platform 102 may process the plurality of historical event processing requests and/or the plurality of historical change instructions by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the change prediction platform 102 may train the quantum change schema model to generate change schema based on input of event processing requests and/or event processing information.

For example, in configuring and/or otherwise training the quantum change schema model, the change prediction platform 102 may identify one or more features in historical event processing requests that correspond to one or more change instructions in the plurality of historical change instructions. For instance, the change prediction platform 102 may, based on historical event processing requests, identify one or more features of one or more historical event processing requests that correspond to one or more historical change instructions. For example, consider a scenario where a historical event processing request includes information indicating an initial destination for the historical event processing request and a final destination for the historical event processing request, different from the initial destination. The change prediction platform 102 may identify this information and may further identify a historical change instruction, from a source and/or channel associated with the historical event processing request (e.g., from a user device associated with the historical event processing request), providing instructions to change the destination of the historical event processing request from the initial destination to the final destination. In this scenario, the change prediction platform 102 may identify a correlation between historical event processing requests associated with the user device and a change instruction providing instructions to change the destination of the historical event processing request from the initial destination to the final destination. In some instances, the change prediction platform 102 may, based on identifying the correlation, train the quantum change schema model to generate change schema based on the correlation. For example, the change prediction platform 102 may train the quantum change schema model to associate change instructions to change the destination of an event processing request from the initial destination to the final destination with event processing requests received from the user device and bound for the initial destination.

Additionally or alternatively, the change prediction platform 102 may train the quantum change schema model using the methods described in the scenario above for one or more different sets of information included in a historical event processing request and one or more different change instructions included in the plurality of historical change instructions. For example, the change prediction platform 102 may train the quantum change schema model based on identifying correlations between a timeframe associated with a historical event processing request and a historical change instruction modifying a timeframe, correlations between an intermediary destination for routing an event processing request and one or more historical change instructions modifying (e.g., by adding or removing) an intermediary destination for routing a historical event processing request, a correlation between an application associated with processing a historical event processing request and a historical change instruction modifying (e.g., adding or removing) an application for processing the historical event processing request, and/or other correlations. It should be understood that the training of the quantum change schema model is not limited to the above examples and that additional comparisons and/or correlations between the plurality of historical event processing requests and the plurality of historical change instructions may be used to train the quantum change schema model.

Accordingly, the change prediction platform 102 may train the quantum change schema model to generate change schema based on the correlations identified by the change prediction platform 102 between the historical event processing requests and the historical change instructions. In these examples, the change prediction platform 102 may train the quantum change schema model to generate change schema that associate event processing requests received by the change prediction platform 102 with change instructions received by the change prediction platform 102 and where the change schema identify, based on the association, one or more parameters for processing the event processing request. For instance, the change prediction platform 102 may train the quantum change schema model to generate, for an event processing request and based on one or more change instructions that the quantum change schema model associates with the event processing request, a change schema that includes one or more of: a timeframe (e.g., hours, days, weeks, or the like) for processing the event processing request, a final destination (e.g., a recipient of a transfer, an account associated with the user of the device sending the event processing request, or the like) for routing the first event processing request after processing, an intermediary destination (e.g., a specific device included in an event processing system such as event processing system 106, an operator (e.g., an employee of the enterprise organization), a department associated with processing a particular type of event processing request, or the like) for routing the event processing request, or an application for processing the event processing request. It should be understood the above description merely represents examples of how the quantum change schema model may be trained to generate change schema, and in one or more additional examples further parameters for processing the event processing request may be included in the change schema.

At step 207, the change prediction platform 102 may train a quantum change prediction model. In some instances, the change prediction platform 102 may configure and/or otherwise train the quantum change prediction model to generate probability scores for event processing requests and to generate sets of predicted change instructions for the event processing requests, based on the plurality of historical event processing requests (which may, e.g., have been encoded as described above at step 203) and based on the plurality of historical change instructions (which may, e.g., have been processed as described above at step 205). In some instances, the plurality of historical change instructions and the plurality of historical event processing requests may be stored in internal memory of the change prediction platform 102, such as memory 112, and/or external memory. The probability scores may indicate a likelihood that a change instruction should be applied to a given event processing request. For example, in some instances, the change prediction platform 102 may receive an event processing request that is not associated with any change instructions received by the change prediction platform 102 (e.g., as described further below at steps 213-214) and might use the quantum change prediction model to identify a likelihood indicating that a change instruction should have been associated with the event processing request. The sets of predicted change instructions may include indications of and/or otherwise identify change instructions to apply and/or associate with an event processing request.

In some instances, to configure and/or otherwise train the quantum change prediction model, the change prediction platform 102 may process the plurality of historical event processing requests and/or the plurality of historical change instructions by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the change prediction platform 102 may train the quantum change prediction model to generate probability scores and sets of predicted change instructions based on input of event processing requests and/or event processing information.

For example, in configuring and/or otherwise training the quantum change prediction model, the change prediction platform 102 may identify one or more features in historical event processing requests that correspond to one or more change instructions in the plurality of historical change instructions. For instance, the change prediction platform 102 may, based on historical event processing requests, identify one or more features of one or more historical event processing requests that correspond to one or more historical change instructions. For example, consider a scenario where a historical event processing request includes information indicating an initial timeframe for processing the historical event processing request and a final timeframe for the historical event processing request, different from the initial timeframe. The change prediction platform 102 may identify this information and may further identify a historical change instruction, from a source and/or channel associated with the historical event processing request (e.g., from a user device associated with the historical event processing request), providing instructions to change the timeframe for processing the historical event processing request. In this scenario, the change prediction platform 102 may identify a correlation between historical event processing requests associated with the user device and a change instruction providing instructions to change the timeframe for processing the historical event processing request. In some instances, the change prediction platform 102 may, based on identifying the correlation, train the quantum change prediction model to generate probability scores and/or sets of predicted change instructions based on the correlation. For example, the change prediction platform 102 may train the quantum change prediction model to associate change instructions to change the timeframe for processing an event processing request from the initial timeframe to the final timeframe with event processing requests received from the user device and designated for processing within the initial timeframe.

Additionally or alternatively, the change prediction platform 102 may train the quantum change prediction model using the methods described in the scenario above for one or more different sets of information included in a historical event processing request and one or more different change instructions included in the plurality of historical change instructions. For example, the change prediction platform 102 may train the quantum change prediction model based on identifying correlations between an initial destination associated with a historical event processing request and a historical change instruction modifying the destination associated with the historical event processing request, correlations between an intermediary destination for routing an event processing request and one or more historical change instructions modifying (e.g., by adding or removing) an intermediary destination for routing a historical event processing request, a correlation between an application associated with processing a historical event processing request and a historical change instruction modifying (e.g., adding or removing) an application for processing the historical event processing request, correlations between a value (e.g., a currency value, a transaction amount, and/or other values) associated with the historical event processing request and a historical change instruction modifying (e.g., increasing or decreasing) the value, and/or other correlations. It should be understood that the training of the quantum change prediction model is not limited to the above examples and that additional comparisons and/or correlations between the plurality of historical event processing requests and the plurality of historical change instructions may be used to train the quantum change prediction model.

Accordingly, the change prediction platform 102 may train the quantum change prediction model to generate probability scores based on the correlations identified by the change prediction platform 102 between the historical event processing requests and the historical change instructions. In these examples, the change prediction platform 102 may train the quantum change prediction model to generate the probability score as a numerical value (e.g., a binary value, an integer value, a percentage, a decimal value, and/or other values). In some instances, the change prediction platform 102 may train the quantum change prediction model to generate the probability score for an event processing request based on a number of correlations identified between the event processing request and one or more change instructions received by the change prediction platform 102. For example, the change prediction platform 102 may train the quantum change prediction model to generate a probability score of 50% for an event processing request based on identifying the event processing request is associated with a particular application and 50% of the historical event processing requests associated with the same application are associated with at least one historical change instruction. It should be understood the above description merely represents examples of how the quantum change prediction model may be trained to generate probability scores, and in one or more additional examples further correlations may be used to generate probability scores for event processing requests.

Additionally, the change prediction platform 102 may train the quantum change prediction model to generate sets of predicted change instructions based on the correlations identified by the change prediction platform 102 between the historical event processing requests and the historical change instructions. In these examples, the change prediction platform 102 may train the quantum change prediction model to generate the sets of predicted change instructions such that input of an event processing request associated with one or more similar parameters to a historical event processing request cause the quantum change prediction model to generate a set of predicted change instructions that includes some or all of the historical change instructions correlated with the historical event processing request. It should be understood the above description merely represents examples of how the quantum change prediction model may be trained to generate sets of predicted change instructions, and in one or more additional examples further correlations may be used to generate sets of predicted change instructions for event processing requests.

At step 208, the change prediction platform 102 may establish a connection with user device 104. For example, change prediction platform 102 may establish a second wireless data connection with the user device 104 to link the user device 104 with the change prediction platform 102 (e.g., in preparation for sending/receiving event processing requests, causing display of interfaces, receiving user input, and/or other functions). In some instances, the change prediction platform 102 may identify whether or not a connection is already established with the user device 104. If a connection is already established with the user device 104, the change prediction platform 102 might not re-establish the connection. If a connection is not yet established with the user device 104, the change prediction platform 102 may establish the second wireless data connection as described above.

Figure 2C:
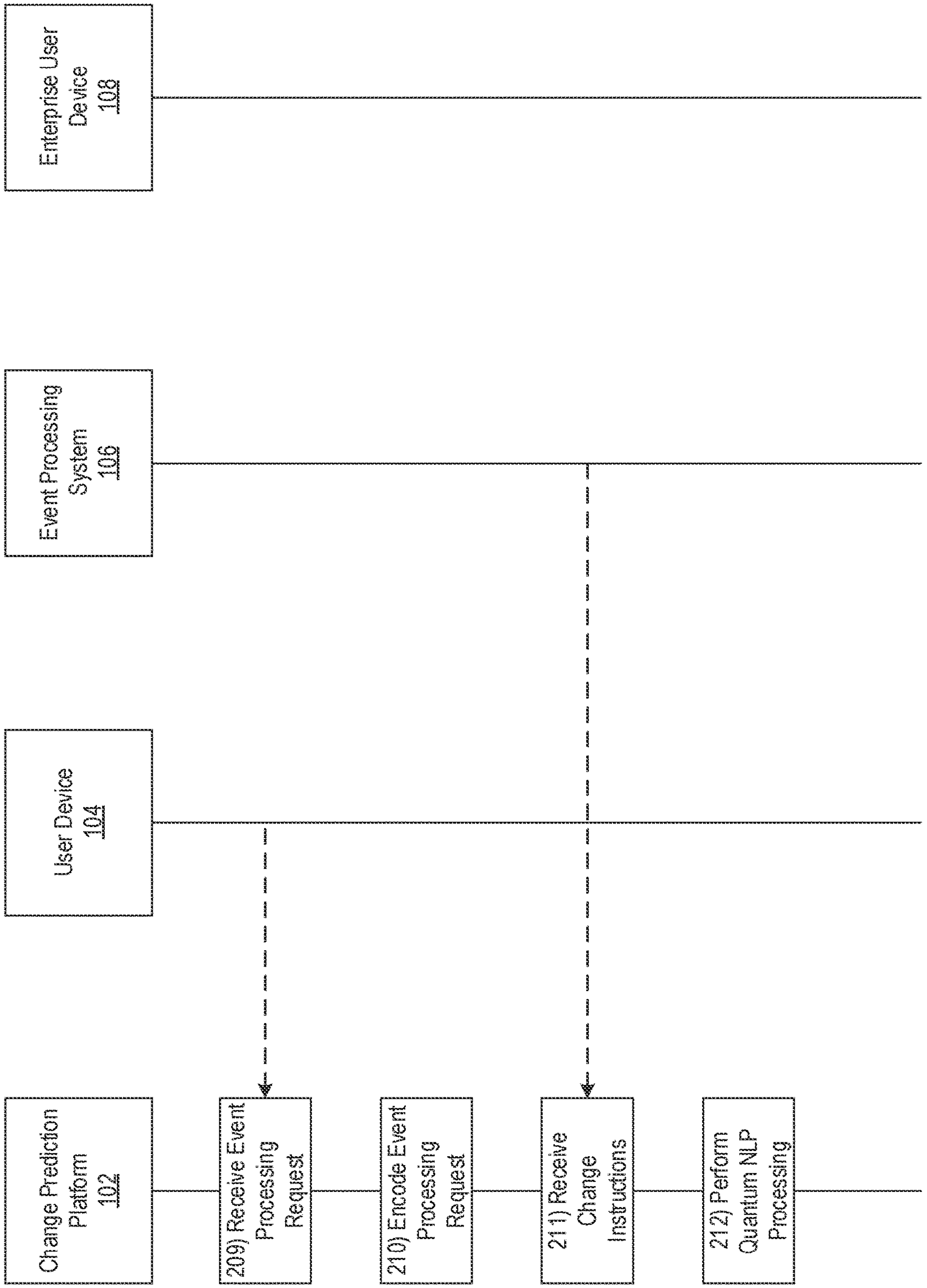

Referring to FIG. 2C, at step 209, the change prediction platform 102 may receive an event processing request from user device 104. For example, the change prediction platform 102 may receive the event processing request via the communication interface 113 and while the second wireless data connection is established. Additionally or alternatively, in some instances the change prediction platform 102 may receive the event processing request from the user device 104 via the event processing system 106. For instance, the user device 104 may first send the event processing request to the event processing system 106 (e.g., via a wireless data connection) which may cause (based on, e.g., one or more computer programs, modules, and/or rulesets stored at event processing system 106) the event processing request to instead be routed to the change prediction platform 102. In some instances, the event processing request may include information associated with one or more maintained profiles (e.g., profiles of clients maintained by the enterprise organization associated with change prediction platform 102, and/or other profiles) and/or information related to processing the event processing request. For example, the event processing request may include information such as an account balance associated with a profile (e.g., the profile of the user of user device 104), numerical values associated with the event processing request, one or more destinations of the event processing request, a third party involved in the event processing request (e.g., commercial vendors, subscription-based services, or the like), the source of the event processing request (e.g., user device 104, and/or the user associated with user device 104), a timeframe associated with processing the event processing request, indicators of one or more applications to be used for processing the event processing request, a type of currency associated with the event processing request, and/or other information.

At step 210, the change prediction platform 102 may encode the event processing request. In some examples, the change prediction platform 102 may encode the event processing request using quantum encoding and using the methods described above at step 203 with respect to encoding the plurality of historical event processing requests.

At step 211, the change prediction platform 102 may receive one or more change instructions. For example, the change prediction platform 102 may receive the one or more change instructions from the event processing system 106 via the communication interface 113 and while the first wireless data connection is established. In some instances, the one or more change instructions may include one or more instructions directing the change prediction platform 102 to, e.g., modify a destination of an event processing request, modify a timeframe (e.g., by adding, removing, increasing, or decreasing the timeframe) associated with processing an event processing request, modify one or more numerical values (e.g., by increasing or decreasing the value) associated with the event processing request, modify one or more indications of applications (e.g., adding an indication or removing an indication) associated with processing the first event processing request, and/or perform other modifications to an event processing request.

At step 212, the change prediction platform 102 may process the one or more change instructions. In some instances, the change prediction platform 102 may process the one or more change instructions using quantum natural language processing (NLP). In these instances, the change prediction platform 102 may process the one or more change instructions using the methods described above at step 205 with respect to the plurality of historical change instructions.

Figure 2D:
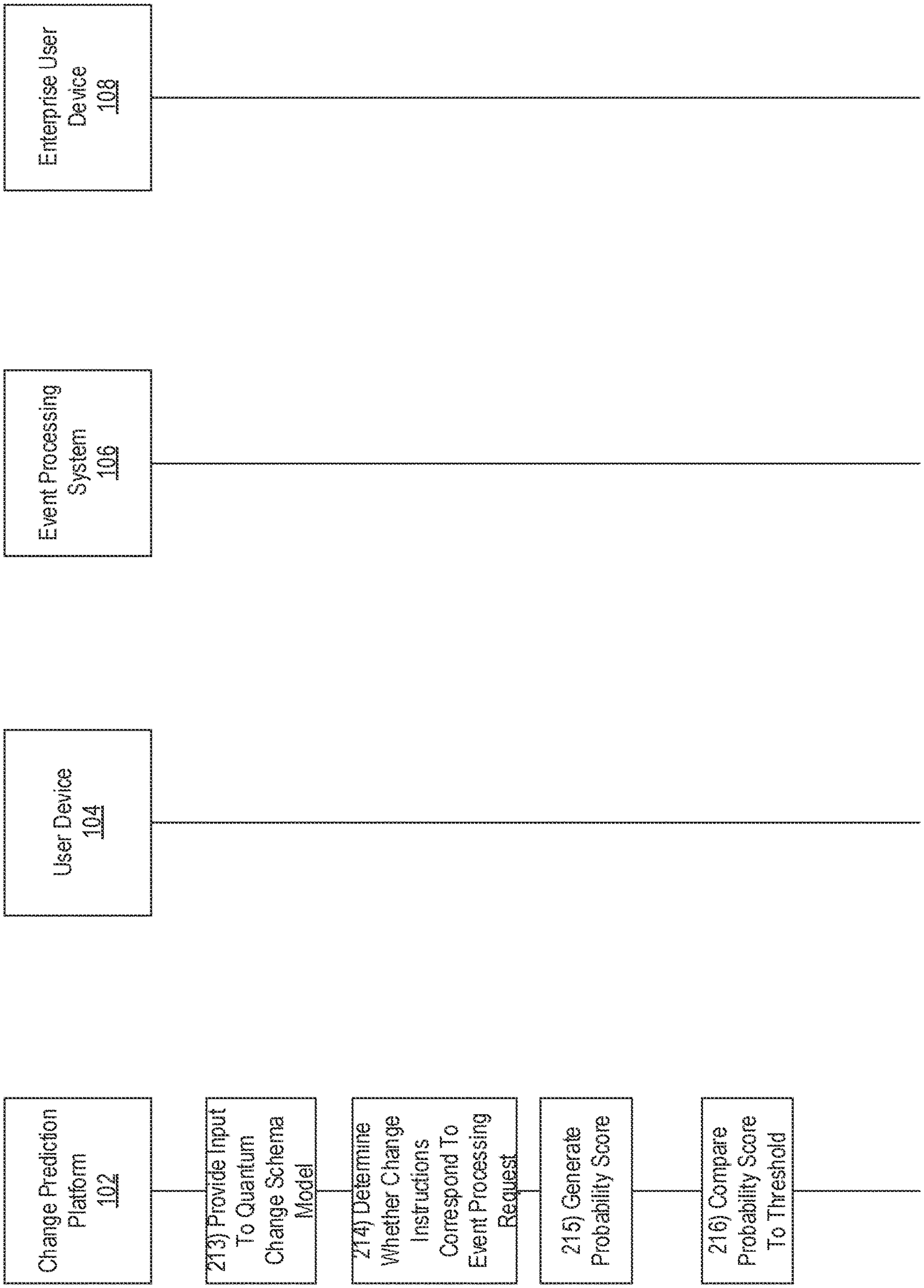

Referring to FIG. 2D, at step 213, the change prediction platform 102 may provide input to the quantum change schema model. For example, the change prediction platform 102 may provide the encoded event processing request and the one or more processed change instructions to the quantum change schema model as input to determine whether any instructions of the one or more change instructions received at step 211 correspond to event processing request.

At step 214, the change prediction platform 102 may determine whether any of the change instructions correspond to the event processing request. For example, the change prediction platform 102 may determine whether any of the one or more change instructions received at step 211 correspond to the event processing request based on inputting the event processing request and the one or more change instructions into the quantum change schema model. In some instances, in determining whether any of the one or more change instructions correspond to the event processing request, the change prediction platform 102 may use the stored correlations between historical event processing requests and historical change instructions used to train the quantum change schema model. For example, the change prediction platform 102 may use the quantum change schema model to identify whether the event processing request includes information and/or parameters that match information and/or parameters of one or more historical event processing requests. For instance, the event processing request may be associated with a timeframe of, e.g., one week. The quantum change schema model may identify one or more historical event processing requests that are also associated with a timeframe of one week. Based on identifying one or more historical event processing requests that match information and/or parameters of the event processing request, the change prediction platform 102 may determine, based on the stored correlations, that one or more of the processed change instructions (which may, e.g., be identical to one or more historical change instructions) correspond to the event processing request.

In some examples, in determining whether change instructions corresponding to the event processing request were received at step 211, the change prediction platform 102 may additionally or alternatively determine whether a quantity of change instructions corresponding to the event processing request satisfies a threshold quantity of change instructions. For example, the change prediction platform 102 may compare a quantity of change instructions corresponding to the event processing request (which may, e.g., have been identified using the quantum change schema model, as described above) with a threshold quantity to determine whether the quantity of change instructions corresponding to the event processing request meets or exceeds the threshold quantity. The threshold quantity may be a value determined by a user (e.g., an employee of the enterprise organization, and/or other users) and may, in some instances, indicate a predicted and/or preferred number of change instructions to be applied to event processing requests received from the user device 104. In some instances, based on determining that the quantity of change instructions corresponding to the event processing request does not meet or exceed the threshold quantity of change instructions, the change prediction platform 102 may determine that the threshold quantity of change instructions has been satisfied. In some examples, based on a determination that the threshold quantity of change instructions has been satisfied, the change prediction platform 102 may proceed to generate a probability score (e.g., as described below at step 215). In some instances, based on a determination that the threshold quantity of change instructions has not been satisfied (e.g., based on determining that the quantity of change instructions corresponding to the event processing request meets or exceeds the threshold quantity), the change prediction platform 102 may proceed to generate a change schema for the event processing request and may not perform the functions described below at steps 215-222.

At step 215, based on a determination that the quantity of change instructions associated with the event processing request satisfies the threshold quantity of change instructions (e.g., based on determining that none of the change instruction received at step 211 correspond to the event processing request), the change prediction platform 102 may generate a probability score for the event processing request. The change prediction platform 102 may generate the probability score for the event processing request by inputting the event processing request into the quantum change prediction model. In generating the probability score, based on inputting the event processing request into the quantum change prediction model, the change prediction platform 102 may use the stored correlations between historical event processing requests and historical change instructions used to train the quantum change prediction model. For example, the change prediction platform 102 may use the quantum change prediction model to identify whether the event processing request includes information and/or parameters that match information and/or parameters of one or more historical event processing requests that are correlated to historical change instructions which were not included in the one or more change instructions received at step 211. For instance, the event processing request may be associated with one or more applications (e.g., programs, modules, rulesets, and/or other applications) for processing the event processing request. The quantum change prediction model may identify one or more historical event processing requests that are also associated with the same applications. Based on identifying the one or more historical event processing requests associated with the same applications, the quantum change prediction model may analyze the one or more historical change instructions correlated with each of the one or more historical event processing requests associated with the same applications. For example, the change prediction platform 102 may use the quantum change prediction model to identify one or more historical change instructions that do not match any of the change instructions received above at step 211.

Based on identifying the one or more historical event processing requests that are also associated with the same applications as the event processing request and based on identifying the one or more historical change instructions that do not match any of the change instructions received above at step 211, the change prediction platform 102 may use the quantum change prediction model to generate a probability score indicating a likelihood that at least one of the one or more identified historical change instructions associated with the event processing request are awaiting identification. For example, the change prediction platform 102 may use the quantum change prediction model to generate a probability score of 60% based on identifying the event processing request is associated with a particular application and 60% of the historical event processing requests associated with the same application are associated with at least one of the identified historical change instructions. In some examples, the likelihood that the at least one identified historical change instruction should be associated with the event processing request may be represented by a numerical value (e.g., a percentage value, or the like) included in the probability score. In these examples, the change prediction platform 102 may cause the quantum change prediction model to generate the probability score as a numerical vale (e.g., an integer value, a percentage value, a decimal value, and/or any other value a quantum neural network is capable of generating).

Additionally or alternatively, in some instances, the change prediction platform 102 may cause the quantum change prediction model to mine (e.g., analyze, parse, read, translate, and/or otherwise mine) the event processing request received at step 209 to identify one or more parameters of the event processing request, in order to generate the probability score. The quantum change prediction model may compare the one or more parameters to one or more historical change instructions to determine one or more correlations between the event processing request and the one or more historical change instructions. For example, the quantum change prediction model may determine a correlation exists where the event processing request includes a parameter such as a first timeframe for processing the event processing request and one or more historical change instructions include instructions to change the timeframe for event processing requests from the user device 104 to a second timeframe. Based on determining the one or more correlations, the quantum change prediction model may generate the probability score based on the number and/or percentage of the historical change instructions that are correlated with the event processing request. For example, the change prediction platform 102 have previously trained the quantum change prediction model to employ a probability algorithm to generate probability scores. For example, the quantum change prediction model may execute the probability algorithm using the following constraints/parameters:

$$\text{If (sum of correlated historical change instructions)} \leq \frac{\text{(total historical change instructions)}}{2},$$

then: probability score = 0%. If else, then: probability score = 100%.

In this example, if the sum of the historical change instructions correlated to the event processing request (e.g., determined using the methods described above) is less than or equal to half of the total number of historical change instructions stored by the change prediction platform 102, the quantum change prediction model may generate a probability score of 0%. Such a probability score may indicate the event processing request does not need to be associated with any change instructions and may further indicate that no change instructions for the event processing request have been missed. Else, the quantum change prediction model will generate a probability score of 100%, which may indicate the event processing request should be associated with at least one change instruction. Note that the above example is merely one algorithm the quantum change prediction model may be trained to employ in order to generate the probability score and in one or more instances additional or alternative algorithms may be employed and/or may correspond to different parameters.

It should be understood that while the above description refers to a single probability score, the change prediction platform 102 may perform the functions described above for a plurality of event processing requests in additional iterations of the methods of using quantum neural networks described herein, without departing from the scope of this disclosure.

At step 216, the change prediction platform 102 may compare the probability score to a threshold score. The threshold score may be a value (e.g., a percentage, an integer value, a decimal value, and/or other values) predetermined by the change prediction platform 102 and used to confirm whether an event processing request should be associated with one or more change instructions. Based on comparing the probability score to the threshold score, the change prediction platform 102 may determine whether the probability score satisfies the threshold score. For example, the change prediction platform 102 may determine whether the probability score meets or exceeds the threshold score. Based on determining that the probability score meets or exceeds the threshold score, the change prediction platform 102 may determine that the probability scores satisfies the threshold score. For instance, based on comparing a probability score of 60% to a threshold score of 50%, the change prediction platform 102 may determine that the probability score satisfies the threshold score. In some instances, based on a determination that the probability score does not satisfy the threshold score, the change prediction platform 102 may proceed to process the event processing request (e.g., as described at step 226, below) without applying any change instructions, and may not perform the functions described at steps 217-225 below. In some examples, based on a determination that the probability score does satisfy the threshold score, the change prediction platform 102 may generate a set of predicted change instructions for the event processing request, as described below at step 217.

Figure 2E:
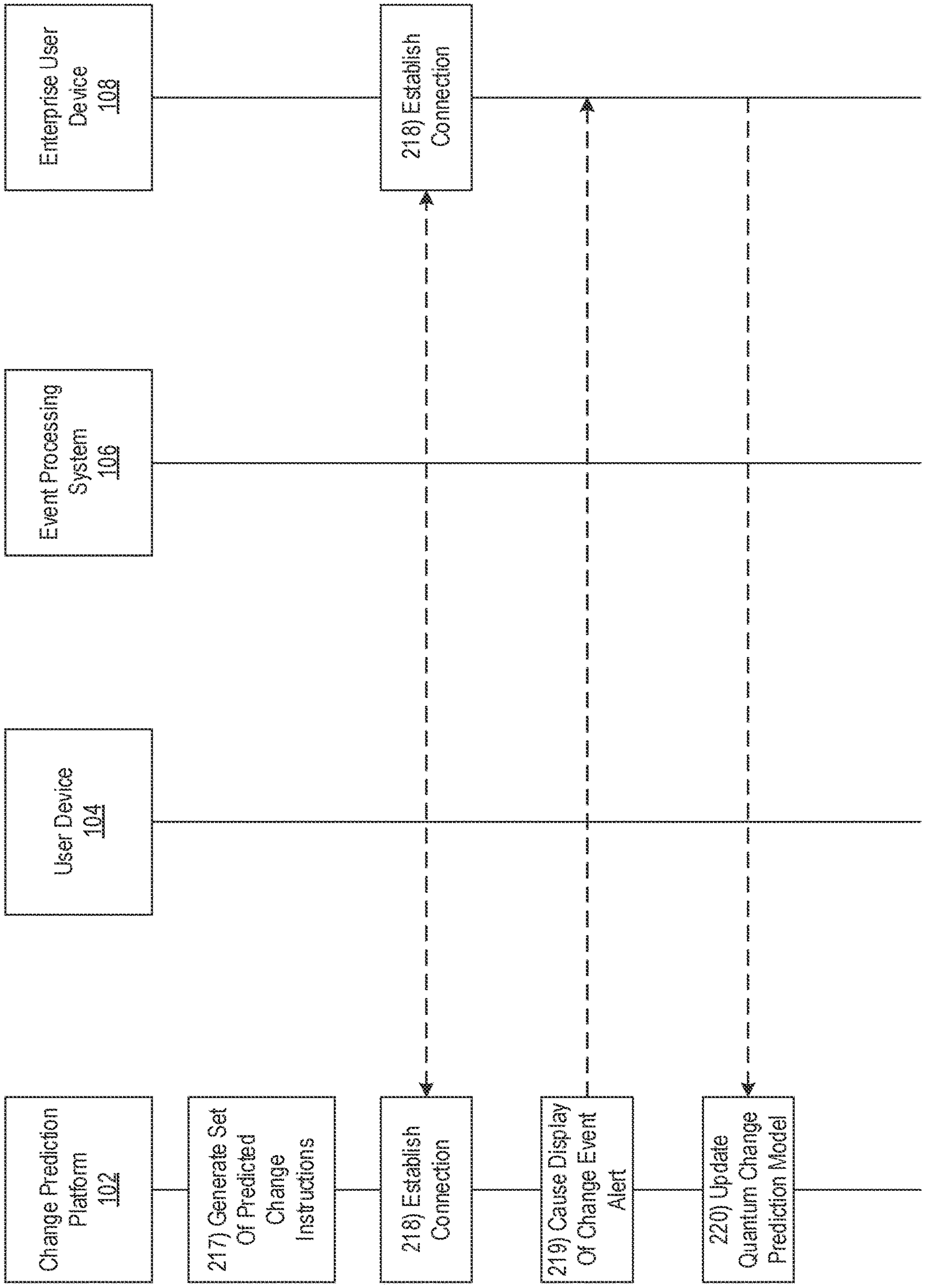

Referring to FIG. 2E, at step 217, based on determining that the probability score satisfies the threshold score, the change prediction platform 102 may generate a set of predicted change instructions for the event processing request. The change prediction platform 102 may generate the set of predicted change instructions for the event processing request by inputting the event processing request into the quantum change prediction model (e.g., as described above at step 215). In generating the set of predicted change instructions, based on inputting the event processing request into the quantum change prediction model, the change prediction platform 102 may use the stored correlations between historical event processing requests and historical change instructions used to train the quantum change prediction model. For example, the change prediction platform 102 may use the quantum change prediction model to select the one or more change instructions corresponding to the event processing request that were identified while generating the probability score (e.g., as described above at step 215). In one or more instances, as described above at step 215, the quantum change prediction model may have identified one or more historical change instructions that do not match any of the change instructions received above at step 211. The identified one or more historical change instructions may, as described further above at step 215, have been correlated with the event processing request by the quantum change prediction model. Accordingly, in these instances, the change prediction platform 102 may cause the quantum change prediction model to generate a set of predicted change instructions that includes the identified one or more historical change instructions. For example, the change prediction platform 102 may cause the quantum change prediction model to generate a set of predicted change instructions that includes one or more instructions to modify a destination of the event processing request, modify (e.g., increase or decrease) a timeframe associated with processing the event processing request, modify one or more indications of applications (e.g., adding or removing an application) associated with the event processing request, modify one or more numerical values (e.g., add, remove, increase, or decrease a value) associated with the event processing request, and/or to perform other actions.

At step 218, the change prediction platform 102 may establish a connection with the enterprise user device 108. For example, change prediction platform 102 may establish a third wireless data connection with the enterprise user device 108 to link the enterprise user device 108 with the change prediction platform 102 (e.g., in preparation for sending event processing requests, causing display of an alert/interface, and/or other functions). In some instances, the change prediction platform 102 may identify whether or not a connection is already established with the enterprise user device 108. If a connection is already established with the enterprise user device 108, the change prediction platform 102 might not re-establish the connection. If a connection is not yet established with the enterprise user device 108, the change prediction platform 102 may establish the third wireless data connection as described above. In some instances, the change prediction platform 102 may establish the connection with the enterprise user device 108 based on identifying the enterprise user device 108 as a device configured to receive a change event alert. For example, in identifying the enterprise user device 108, the change prediction platform 102 may input the set of predicted change instructions into the microservice system included in event processing system 106 (e.g., via the wireless communication interface 113 and while the first wireless data connection is established). Accordingly, the microservice system may apply one or more applications dedicated to identifying devices configured to receive change alerts and hosted, stored, and/or otherwise maintained by the event processing system 106. Based on applying the one or more applications, the microservice system may identify the enterprise user device 108 as a device configured to receive a change event alert and the change prediction platform 102 may, in response, establish the third wireless data connection as described above.

At step 219, the change prediction platform 102 may transmit and cause the display of a user interface at the enterprise user device 108. For example, the change prediction platform 102 may transmit and cause display of a change event alert interface. In transmitting and causing display of the change event alert interface, the change prediction platform 102 may send one or more display commands directing the enterprise user device 108 to display a user interface. Based on or in response to the one or more display commands, the enterprise user device 108 may display the change event alert interface.

Figure 3A:
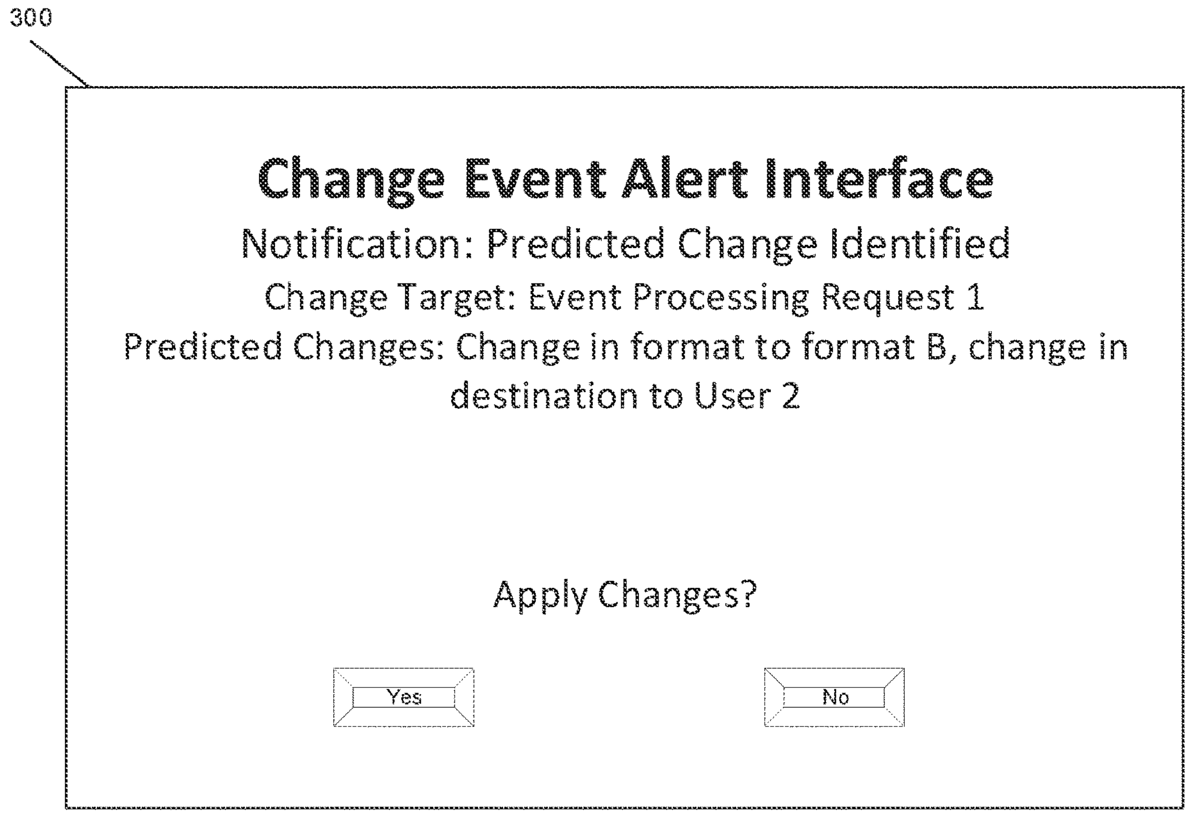
FIGS. 3A-3C depict illustrative graphical user interfaces depicting example change event alert/notifications generated in response to processing event processing requests with a change prediction platform using quantum neural networks in accordance with one or more example arrangements.

For instance, in displaying the change event alert interface, the enterprise user device 108 may display a graphical user interface similar to change event alert interface 300, which is illustrated in FIG. 3A. Referring to FIG. 3A, in some instances, the change event alert interface 300 may include information corresponding to the event processing request and/or corresponding to the set of predicted change instructions. For example, the change event alert interface 300 may include information such as a notification that a predicted change instruction has been identified, a target of the predicted change instruction (e.g., the event processing request), a list of predicted changes corresponding to the set of predicted change instructions (e.g., a change in the format of an event processing request, an instruction to modify a destination of the event processing request, an instruction to modify (e.g., increase or decrease) a timeframe associated with processing the event processing request, an instruction to modify one or more indications of applications (e.g., adding or removing an application) associated with the event processing request, an instruction to modify one or more numerical values (e.g., add, remove, increase, or decrease a value) associated with the event processing request, and/or instructions to perform other actions), and/or other information. The change event alert interface 300 may also display interface elements or selectable options requesting user input. For example, the change event alert interface 300 may display one or more of: an information entry field, a button or buttons, toggle or toggles, check box or boxes, and/or other interface elements. For example, as illustrated in FIG. 3A, the interface elements may be one or more buttons the user might toggle to confirm or deny application of the changes associated with the set of predicted change instructions. In some instances, based on user input confirming or denying application of the changes associated with the set of predicted change instructions, the enterprise user device 108 may provide the user input to the change prediction platform 102 to update the quantum change prediction model (e.g., as described below at step 220).

Referring back to FIG. 2E, at step 220, the change prediction platform 102 may refine, validate, and/or otherwise update the quantum change prediction model. In some instances, the change prediction platform 102 may update the quantum change prediction model using the probability score and/or the set of predicted change instructions generated above at steps 215 and 217, respectively. In some instances, updating the quantum change prediction model may include inputting the probability score and/or the set of predicted change instructions into the quantum change prediction model. By providing these inputs, the change prediction platform 102 may create an iterative feedback loop that may continuously and dynamically refine the quantum change prediction model to improve its accuracy. For example, based on inputting a set of change instructions for the event processing request that correspond to one or more historical change instructions, and based on inputting the probability score, the change prediction platform 102 may cause the quantum change prediction model to store a correlation between the event processing request and the one or more corresponding historical change instructions. Based on the stored correlation, the change prediction platform 102 may refine, validate, and/or otherwise update the quantum change prediction model to generate probability scores that meet or exceed the probability score for the event processing request, based on future input of additional event processing requests (e.g., where the additional event processing requests share some or all of the parameters of the input event processing request).

Additionally or alternatively, the change prediction platform 102 may refine, validate, and/or otherwise update the quantum change prediction model to generate sets of predicted change instructions based on, in some instances, the stored correlation. For example, the change prediction platform 102 may update the quantum change prediction model to generate sets of predicted change instructions that include the historical change instructions corresponding to the event processing request received at step 209 for event processing requests, sharing parameters with the event processing request received at step 209 and received by the change prediction platform 102 in future iterations of the feedback loop.

Additionally or alternatively, in some instances, the change prediction platform 102 may refine, validate, and/or otherwise update the quantum change prediction model based on user input (e.g., user input received from the enterprise user device 108 and in response to displaying the change event alert interface, as described above at step 219). For example, the change prediction platform 102 may input the user input into the quantum change prediction model. Based on inputting the user input, the change prediction platform 102 may change the quantum change prediction model to modify one or more stored correlations between historical event processing requests and historical change instructions used to generate probability scores and/or to generate sets of predicted change instructions. For instance, based on user input confirming application of the changes associated with the set of predicted change instructions, the change prediction platform 102 may update the quantum change prediction model to store the event processing request as a historical event processing request and store a new correlation between the newly stored event processing request and the historical change instructions included in the set of predicted change instructions. In these instances the new correlations may be used in future iterations of the feedback loop to generate probability scores and/or sets of predicted change instructions for additional event processing requests.

In updating the quantum change prediction model, the change prediction platform 102 may improve the accuracy and success rate of the probability score and set of predicted change instructions generation processes, which may, e.g., result in more efficient training of quantum neural networks trained by the change prediction platform 102 (and may in some instances, conserve computing and/or processing power/resources in doing so). The change prediction platform 102 may further prevent change instructions that should be associated with event processing request from being missed in future iterations of the feedback loop, based on updating the quantum change prediction model.

Figure 2F:
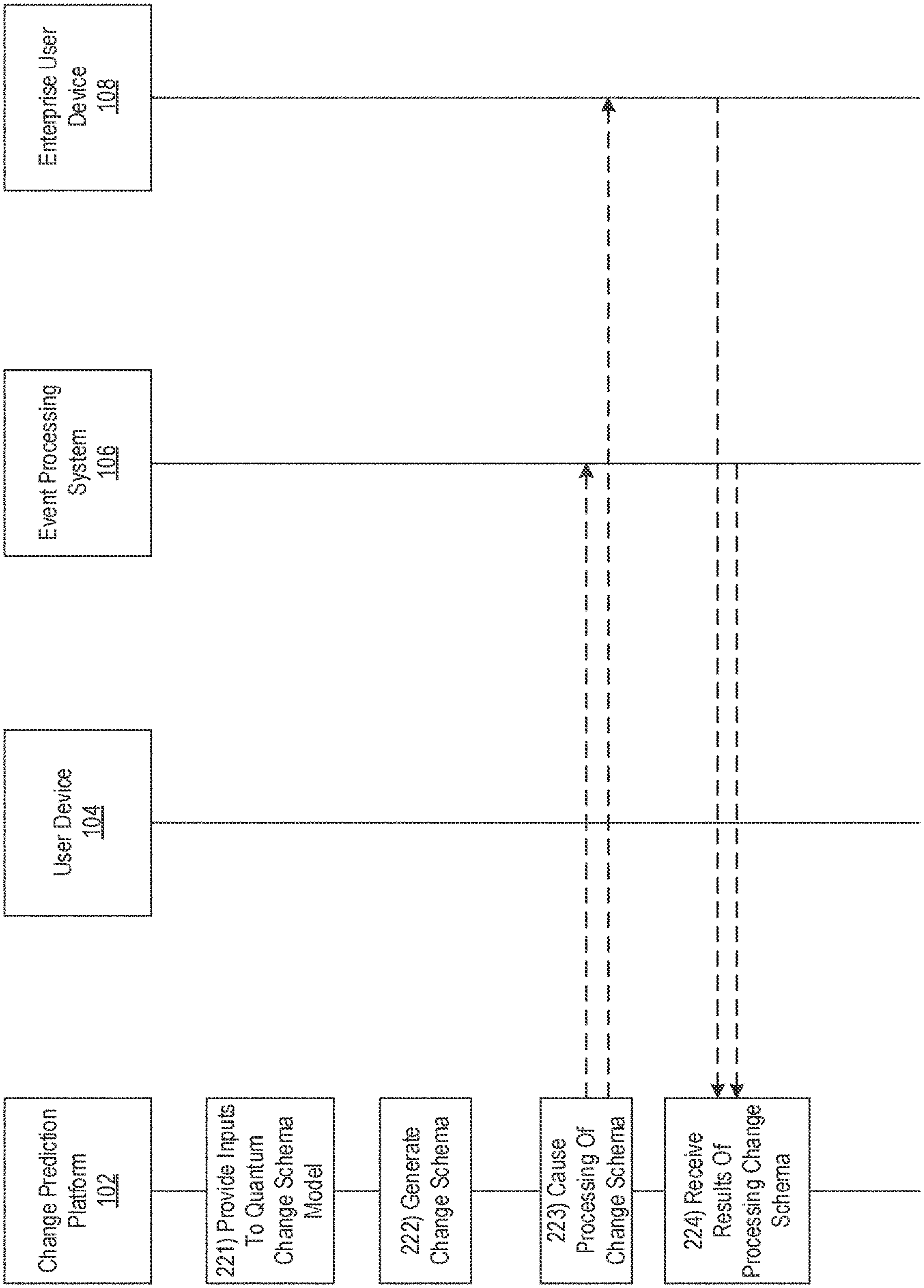

Referring to FIG. 2F, at step 221, the change prediction platform 102 may provide inputs to the quantum change schema model. For example, based on generating a set of predicted change instructions for the event processing request (as described above at steps 215-220) the change prediction platform 102 may provide the event processing request and/or the set of predicted change instructions to the quantum change schema model as inputs. In some instances, based on providing the set of predicted change instructions to the quantum change schema model, the change prediction platform 102 may cause the quantum change schema model to generate change schema and perform the additional functions described below at steps 222-229 based on the set of predicted change instructions.

At step 222, the change prediction platform 102 may generate a change schema for the event processing request. The change prediction platform 102 may generate the change schema for the event processing request by inputting the encoded event processing request and one or more change instructions into the quantum change schema model. In some instances, the one or more change instructions may be the one or more change instructions received at step 211 and processed at step 212. In other examples, the one or more change instructions may be the set of predicted change instructions generated using the quantum change prediction model, as described above at step 217. In generating the change schema, based on inputting the event processing request and the one or more change instructions into the quantum change schema model, the change prediction platform 102 may use the stored correlations between historical event processing requests and historical change instructions used to train the quantum change schema model. For example, the change prediction platform 102 may use the quantum change schema model to identify whether the event processing request includes information and/or parameters that match information and/or parameters of one or more historical event processing requests that are correlated to one or more historical change instructions. For instance, the event processing request may be associated with a timeframe (e.g., hours, days, weeks, months, or the like) for processing the event processing request. The quantum change schema model may identify, based on the stored correlations, one or more historical event processing requests that are associated with the same timeframe. Based on identifying the one or more historical event processing requests associated with the same timeframe, the quantum change schema model may compare the one or more historical change instructions correlated with each of the one or more historical event processing requests associated with the same timeframe to the one or more change instructions received as input.

Based on comparing the historical change instructions and the one or more change instructions as described above, the change prediction platform 102 may use the quantum change schema model to generate a change schema that identifies one or more parameters for processing the first event processing request based on the one or more change instructions. For example, the change prediction platform 102 may use the quantum change schema model to generate a change schema that includes parameters determined by instructions included in the one or more instructions that the quantum change schema model identifies as matches for instructions in the historical change instructions based on the comparison. For instance, a change instruction received at step 211 may include an instruction to change a timeframe associated with processing an event processing request from two hours to one hour. Based on the comparison, the quantum change schema model may identify a historical change instruction that includes an instruction to change a timeframe associated with processing an event processing request received from the user device 104 from two hours to one hour. Accordingly, the change prediction platform 102 may cause the quantum change schema model to generate a change schema that includes a parameter to process the event processing request within one hour. In some instances, the parameters included in the change schema may include parameters such as a timeframe for processing the event processing request, a final destination for routing the event processing request, an intermediary destination for routing the event processing request, an application for processing the event processing request, and/or other parameters.

Additionally or alternatively, in some instances, the change prediction platform 102 may cause the quantum change schema model to mine (e.g., analyze, parse, read, translate, and/or otherwise mine) the event processing request received at step 209 and the change instructions received as input, to generate the change schema for the event processing request. The quantum change schema model may compare information mined from the event processing request to the historical event processing requests and/or may compare information mined from the change instructions to the historical change instructions to identify correlations between the event processing request and the historical event processing request and/or to identify correlations between the change instructions and the historical change instructions. For example, the quantum change schema model may have previously trained the quantum change schema model to employ a comparison algorithm to generate identify the correlations and generate the change schema. For example, the quantum change schema model may execute a comparison algorithm that uses the following steps/parameters:

1) Identify historical event processing requests corresponding to the input event processing request based on matching parameters.
2) Identify historical change instructions corresponding to the identified historical event processing requests based on stored correlations
3) Identify change instructions of the one or more received change instructions corresponding to the historical change instructions based on matching instructions
4) Identify parameters for change schema based on identified change instructions
5) Generate change schema using identified parameters It should be understood that while the above description refers to a single change schema, the change prediction platform 102 may perform the functions described above for a plurality of event processing requests in additional iterations of the methods of using quantum neural networks described herein, without departing from the scope of this disclosure.

At step 223, the change prediction platform 102 may cause processing of the change schema for the event processing request. In some examples, in causing processing of the change schema, the change prediction platform 102 may send the change schema to the event processing system 106 with commands for the microservice system hosted by event processing system 106 to process the change schema. For instance, the change prediction platform 102 may send one or more commands directing the microservice system to process the change schema by implementing one or more changes to the event processing request. In these instances, the change prediction platform 102 may cause the microservice system to modify one or more parameters of the event processing request based on the change schema. For example, based on a parameter in the change schema indicating an application for processing the event processing request, the change prediction platform 102 may cause the microservice system to apply the application (which may, e.g., be stored separately from other applications by the microservice system, as part of the normal operation of the event processing system 106) to the event processing request. Applying the application may cause one or more changes to the event processing request (e.g., modification of a value associated with the event processing request, modification permissions associated with accessing the event processing request, and/or other changes).

Additionally or alternatively, in some examples, in causing the microservice system to modify one or more parameters of the event processing request the change prediction platform 102 may cause the microservice system to broadcast notifications indicating the one or more change parameters to one or more devices of the event processing system 106. For example, the change prediction platform 102 may send one or more commands to broadcast notifications to devices of the event processing system 106 associated with implementing changes based on parameters included in change schema. In these examples, the change prediction platform 102 may transmit and cause display of a user interface at a device included in the event processing system 106 as part of the broadcast notifications. For example, the change prediction platform 102 may transmit and cause the display of a user interface at the enterprise user device 108. In some instances, the change prediction platform 102 may transmit and cause display of a change schema interface. In transmitting and causing display of the change schema interface, the change prediction platform 102 may send one or more display commands directing the microservice system to broadcast a notification that causes enterprise user device 108 to display a user interface. Based on or in response to the one or more display commands, the enterprise user device 108 may display the change schema interface.

Figure 3B:
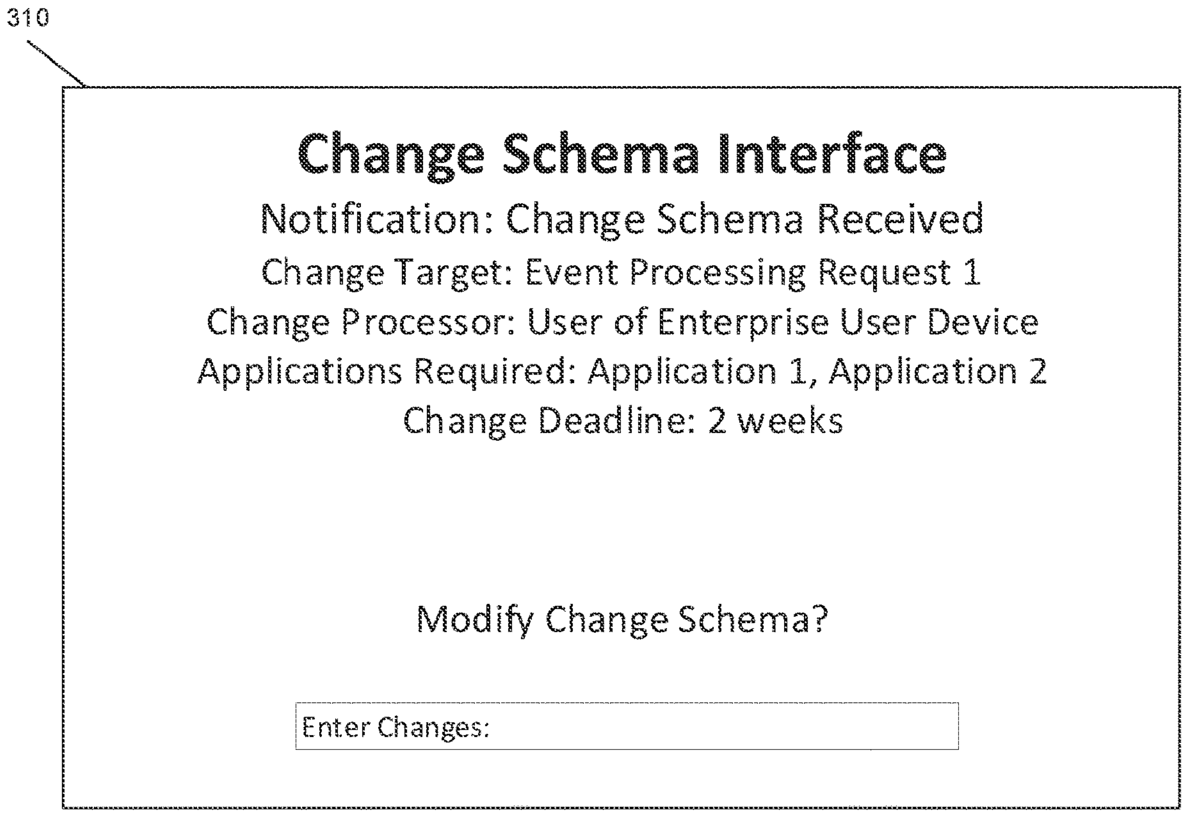

For instance, in displaying the change schema interface, the enterprise user device 108 may display a graphical user interface similar to change schema interface 310, which is illustrated in FIG. 3B. Referring to FIG. 3B, in some instances, the change schema interface 310 may include information corresponding to the event processing request and/or corresponding to the change schema. For example, the change schema interface 310 may include information such as a notification that a change schema was received by the event processing system 106, an indication of the event processing request, an identification of a system and/or user (e.g., an employee of the enterprise organization associated with the enterprise user device 108, and/or other users) responsible for processing the change schema, a list of the parameters included in the change schema (e.g., a timeframe for processing the event processing request, a final destination for routing the event processing request, an intermediary destination for routing the event processing request, an application for processing the event processing request, and/or other parameters) and/or other information. The change schema interface 310 may also display interface elements or selectable options requesting user input. For example, the change schema interface 310 may display one or more of: an information entry field, a button or buttons, toggle or toggles, check box or boxes, and/or other interface elements. For example, as illustrated in FIG. 3B, the interface elements may be an information entry field the user of the enterprise user device 108 may use to modify the change schema. In some instances, based on user input modifying the change schema, the enterprise user device 108 may cause the microservice system to process the change schema based on the modifications (e.g., as described below referring back to step 223). In some examples, the enterprise user device 108 may send and/or cause sending of the user input to the change prediction platform 102 (e.g., in order to update the quantum change schema model, as described below at step 225).

Referring back to FIG. 2F and step 223, based on receiving user input modifying the change schema the microservice system may continue to process the change schema by processing the modifications to the change schema. For example, the microservice system may process the modified change schema using the functions described above with respect to step 223. In some examples, in processing the modified change schema, the microservice system may implement one or more changes to the event processing request. For example, based on the user input, the microservice system may modify a timeframe for processing the event processing request, modify a final destination for routing the event processing request, modify an intermediary destination for routing the event processing request, and/or implement other changes. For instance, based on user input (e.g., from the enterprise user device 108, and/or other enterprise user devices) indicating the event processing request should be routed to a different enterprise user device for further processing, the microservice system may route the event processing request to the different enterprise user device as an intermediary destination. In some examples, the microservice system may provide the results of the changes implemented on the event processing requests as results to the change prediction platform 102 (e.g., as described below at step 224).

At step 224, the change prediction platform 102 may, based on causing processing of the change schema, receive one or more results and/or indications of results of processing the change schema. In some instances, the change prediction platform 102 may receive the one or more results and/or indications of results from the event processing system 106 (e.g., via the communication interface 113 and while the first wireless data connection is established) and/or from the enterprise user device 108 (e.g., via the communication interface 113 and while the third wireless data connection is established). In some instances, in receiving the one or more results and/or indications of results of processing the change schema, the change prediction platform 102 may receive one or more indications of whether parameters included in the change schema satisfy parameters of the event processing requests. For example a device and/or program included in event processing system 106 and/or a user associated with the event processing system 106 may make a separate determination indicating what parameters should apply to the event processing request (e.g., after the change prediction platform 102 causes processing of the change schema and the device, program, and/or user is notified of the event processing request, as described above at step 223). Based on the determination, the device, program, and/or user may provide an indication of whether the parameters included in the change schema satisfy parameters of the event processing request determined by the device, program, and/or user. The indications may include one or more of an indication of whether an application identified by the change schema satisfies a parameter of the event processing request, an indication of whether a destination, identified by the change schema, satisfies a parameter of the event processing request, an indication of whether a timeframe, identified by the change schema and for processing the event processing request, satisfies a parameter of the event processing request, and/or other indications. In some instances, the indications may be generated automatically by an application, system, device, and/or by other electronic methods. Additionally or alternatively, in some examples, the indications may be included in user input associated with the change schema and providing instructions to update the change schema and/or the quantum change schema model. For example, the indications may be included in user input received from the enterprise user device 108 (and/or other enterprise user devices) as a result of a microservice broadcast of the change schema.

Figure 2G:
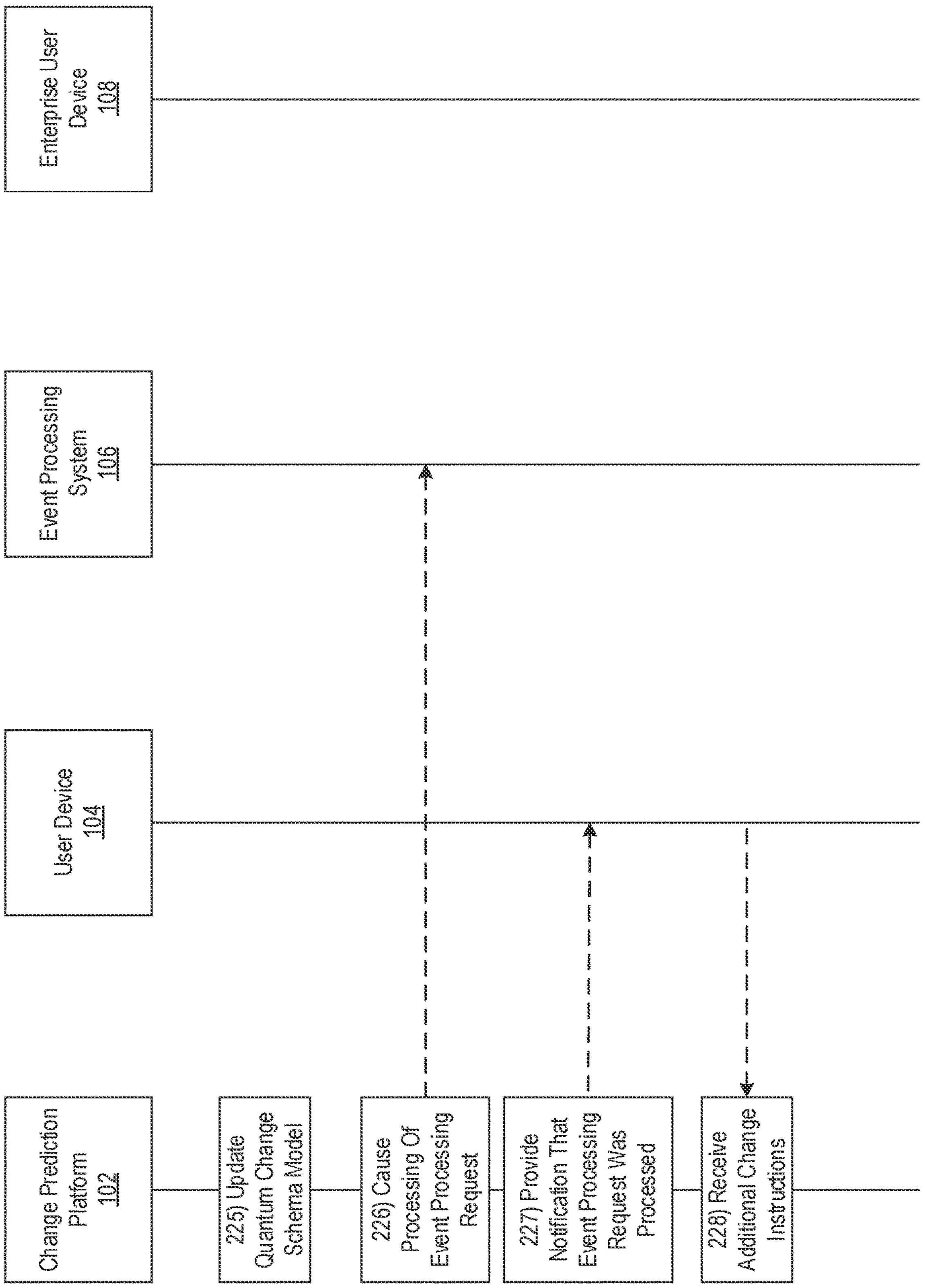

Referring to FIG. 2G, at step 225 the change prediction platform 102 may refine, validate, and/or otherwise update the quantum change schema model. For example, the change prediction platform 102 may update the quantum change schema model based on the one or more results and/or indications of results of processing the change schema. In some instances, updating the quantum change schema model may include inputting the one or more results and/or indications of results into the quantum change schema model. By providing this input into the quantum change schema model, the change prediction platform 102 may create an iterative feedback loop that may continuously and dynamically refine the quantum change schema model to improve its accuracy. For example, based on inputting the one or more results and/or indications of results, the change prediction platform 102 may cause the quantum change schema model to generate change schema for event processing requests in future iterations of the feedback loop by storing, based on the results and/or indications of results, one or more correlations between the event processing request and the one or more change instructions and/or the set of predicted change instructions. For instance, based on identifying that the results include an indication that a parameter of the event processing request was not satisfied by the change schema, the change prediction platform 102 may refine the quantum change schema model to generate additional change schema in future iterations of the feedback loop that do not include the change instruction that caused the indication. For example, based on an indication that a timeframe identified by the change schema did not satisfy a timeframe parameter of the event processing request, the change prediction platform 102 may refine the quantum change schema model to generate future change schema that identify a different timeframe. Additionally or alternatively, based on identifying that the results include an indicate that a parameter of the event processing request was satisfied by the change schema, the change prediction platform 102 may refine the quantum change schema model to generate additional change schema in future iterations of the feedback loop that do include the change instruction that caused the indication.

In updating the quantum change schema model, the change prediction platform 102 may improve the accuracy and effectiveness of the change schema generation process, which may, e.g., result in more efficient training of quantum neural networks trained by the change prediction platform 102 (and may in some instances, conserve computing and/or processing power/resources in doing so). The change prediction platform 102 may further cause the quantum change schema model to improve the change prediction methods described herein by generating more accurate change schema, as described above.

At step 226, the change prediction platform 102 may cause the event processing request to be processed. For example, the change prediction platform 102 may send the event processing request to the event processing system 106 for processing (e.g., via the communication interface 113 and while the first wireless data connection is established). Additionally, in some examples, the change prediction platform 102 may send one or more commands to the event processing system 106 directing the event processing system 106 to process the event processing request. Based on receiving the event processing request and the one or more commands from the event processing system 106, the event processing system 106 may process the event processing request. For example, the event processing system 106 may analyze the event processing information included in the event processing request and initiate one or more functions to execute the event processing request. In some examples, the one or more functions may be and/or include processing the event processing request using one or more applications identified by the change schema, processing the event processing request by routing the event processing request to one or more intermediary destinations identified by the change schema, processing the event processing request by routing the event processing request to a final destination identified by the change schema, and/or other functions. Additionally or alternatively, in some instances the one or more functions may be and/or include changes based on change instructions included in the set of predicted change instructions (which may, e.g., be included in the change schema). Accordingly, in these instances, the event processing request may be processed based on the set of predicted change instructions.

At step 227, based on causing the event processing request to be processed, the change prediction platform 102 may provide a notification to the user (e.g., the user of user device 104) that the event processing request originated from. For example, the change prediction platform 102 may provide a notification that the event processing request was processed to the user by sending a notification to user device 104 (e.g., via the communication interface 113 and while the second wireless data connection is established). In some instances, in providing the notification, the change prediction platform 102 may provide the notification by transmitting and causing display of a user interface at the user device 104. In some instances, the change prediction platform 102 may transmit and cause display of a change instruction interface. In transmitting and causing display of the change instruction interface, the change prediction platform 102 may send one or more display commands directing the user device 104 to display a user interface. Based on or in response to the one or more display commands, the user device 104 may display the change instruction interface.

Figure 3C:
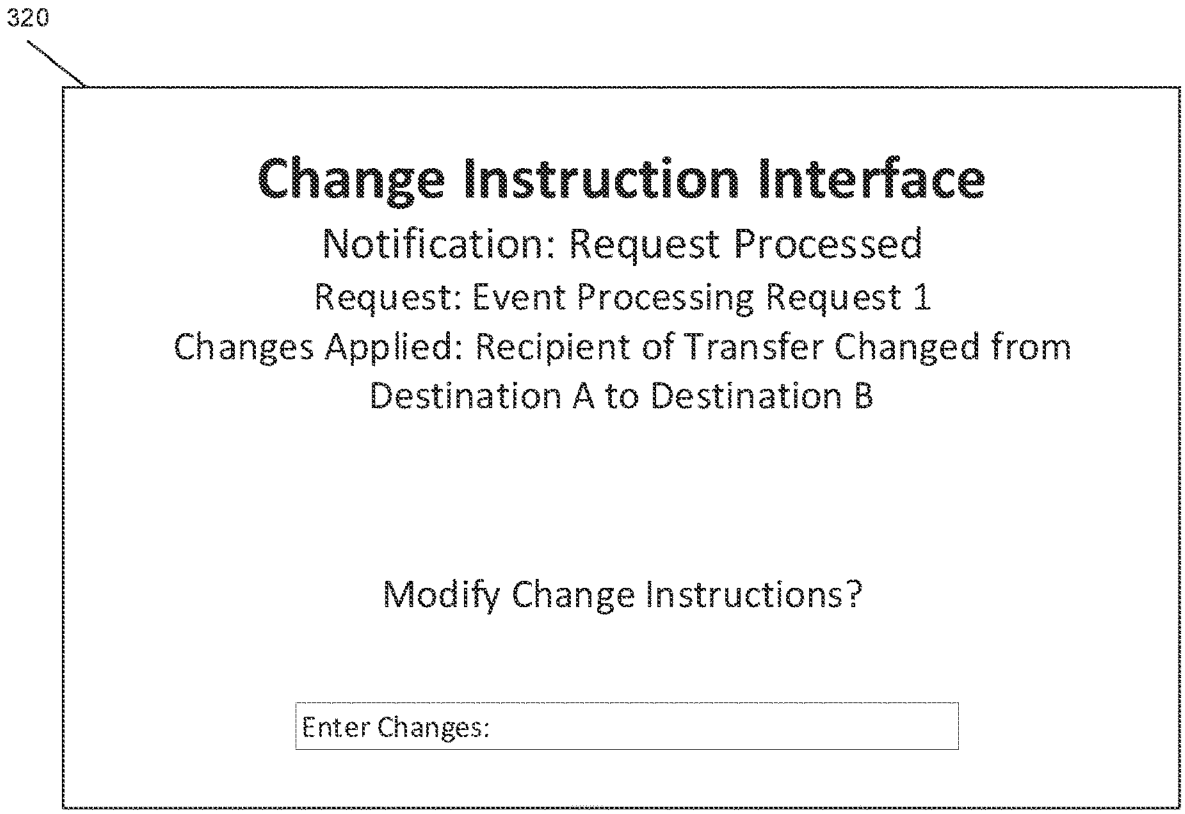

For instance, in displaying the change instruction interface, the user device 104 may display a graphical user interface similar to change instruction interface 320, which is illustrated in FIG. 3C. Referring to FIG. 3C, in some instances, the change instruction interface 320 may include information corresponding to the event processing request and/or corresponding to the processing of the change schema. For example, the change instruction interface 320 may include information such as a notification that the event processing request was processed, an indication of which event processing request was processed, a summary of the changes and/or parameters were applied to the event processing request during the processing (which may, e.g., be changes to parameters included in the change schema), and/or other information. The change instruction interface 320 may also display interface elements or selectable options requesting user input. For example, the change instruction interface 320 may display one or more of: an information entry field, a button or buttons, toggle or toggles, check box or boxes, and/or other interface elements. For example, as illustrated in FIG. 3C, the interface elements may be an information entry field the user of the user device 104 may use to modify change instruction. For instance, the user device 104 may be able to modify change instructions for future event processing requests of a same type as the event processing request processed at step 226 above. In some instances, based on user input modifying the change instructions, the user device 104 may provide user input to the change prediction platform 102 (e.g., as described below at step 228). In some examples, the user device 104 may send and/or cause sending of the user input (e.g., the modified change instructions) to the change prediction platform 102 (e.g., in order to update the quantum change schema model, as described below at step 229).

Referring back to FIG. 2G, at step 228, the change prediction platform 102 may receive additional change instructions from the user device 104 (e.g., via the communication interface 113 and while the second wireless data connection is established). For example, the change prediction platform 102 may receive one or more modified change instructions and/or new change instructions for future event processing requests from the user device 104. In some instances, the modified change instructions may include one or more of: instructions to modify a destination of additional event processing requests, instructions to modify timeframes associated with additional event processing requests, instructions to modify indications of applications associated with processing additional event processing requests, instructions to modify one or more numerical values associated with additional event processing requests, and/or other instructions.

Figure 2H:
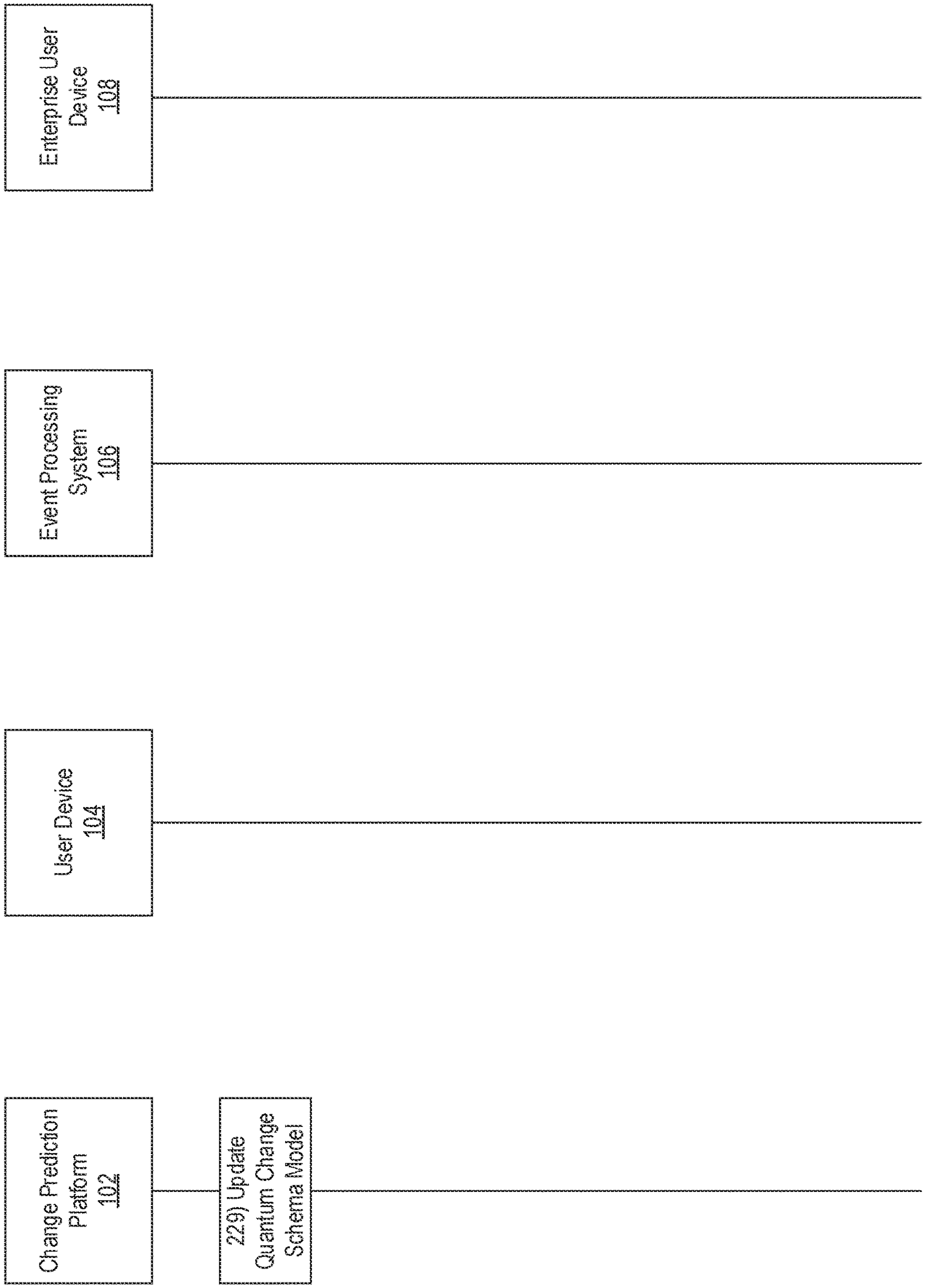

Referring to FIG. 2H, at step 229, the change prediction platform 102 may refine, validate, and/or otherwise update the quantum change schema model. For example, the change prediction platform 102 may update the quantum change schema model based on the one or more modified change instructions received from the user device 104 (e.g., as described above at step 228). In some instances, updating the quantum change schema model may include inputting the one or more modified change instructions into the quantum change schema model. By providing this input into the quantum change schema model, the change prediction platform 102 may create an iterative feedback loop that may continuously and dynamically refine the quantum change schema model to improve its accuracy. For example, based on inputting the one or more modified change instructions, the change prediction platform 102 may cause the quantum change schema model to generate change schema for event processing requests in future iterations of the feedback loop by storing, based on the results and/or indications of results, the one or more modified change instructions as historical change instructions. For instance, based on identifying that the one or more modified change instructions include a change instruction indicating, e.g., that all event processing requests sent by the user device 104 should be processed within a particular timeframe (e.g., two days, and/or other timeframes), the change prediction platform 102 may refine the quantum change schema model to generate additional change schema in future iterations of the feedback loop that include a parameter that the additional event processing requests should be processed within the particular timeframe.

In updating the quantum change schema model, the change prediction platform 102 may improve the accuracy and effectiveness of the change schema generation process, which may, e.g., result in more efficient training of quantum neural networks trained by the change prediction platform 102 (and may in some instances, conserve computing and/or processing power/resources in doing so). The change prediction platform 102 may further cause the quantum change schema model to improve the change prediction methods described herein by generating more accurate change schema, as described above.

Figure 4A:
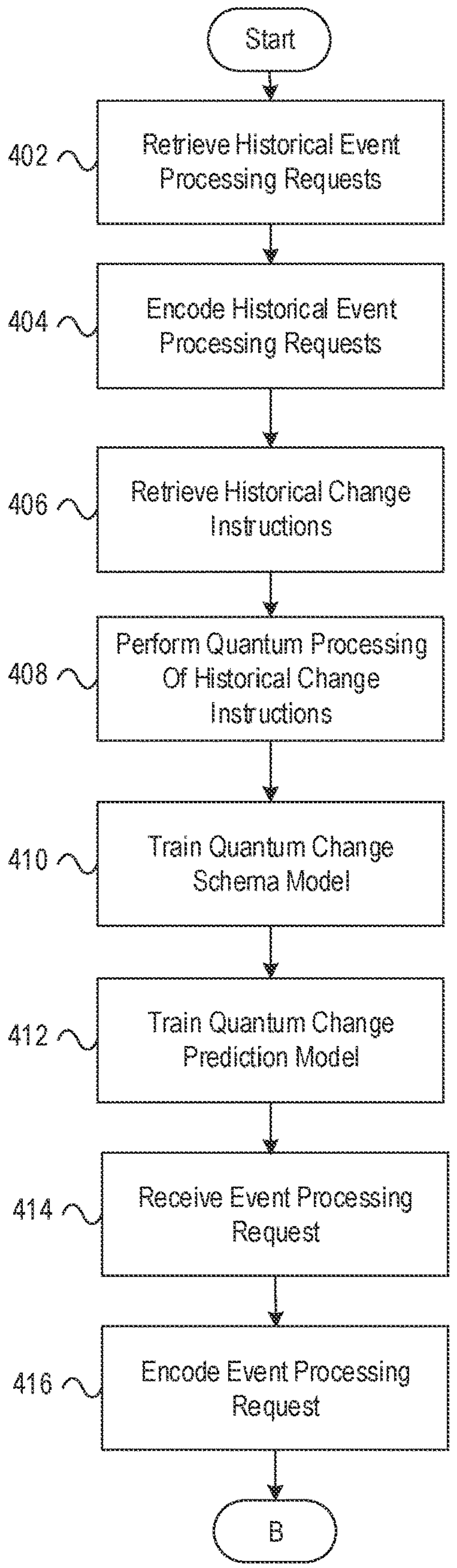
FIGS. 4A-4B depict an illustrative method for implementing a change prediction platform using quantum neural networks in accordance with one or more example arrangements.
Figure 4B:
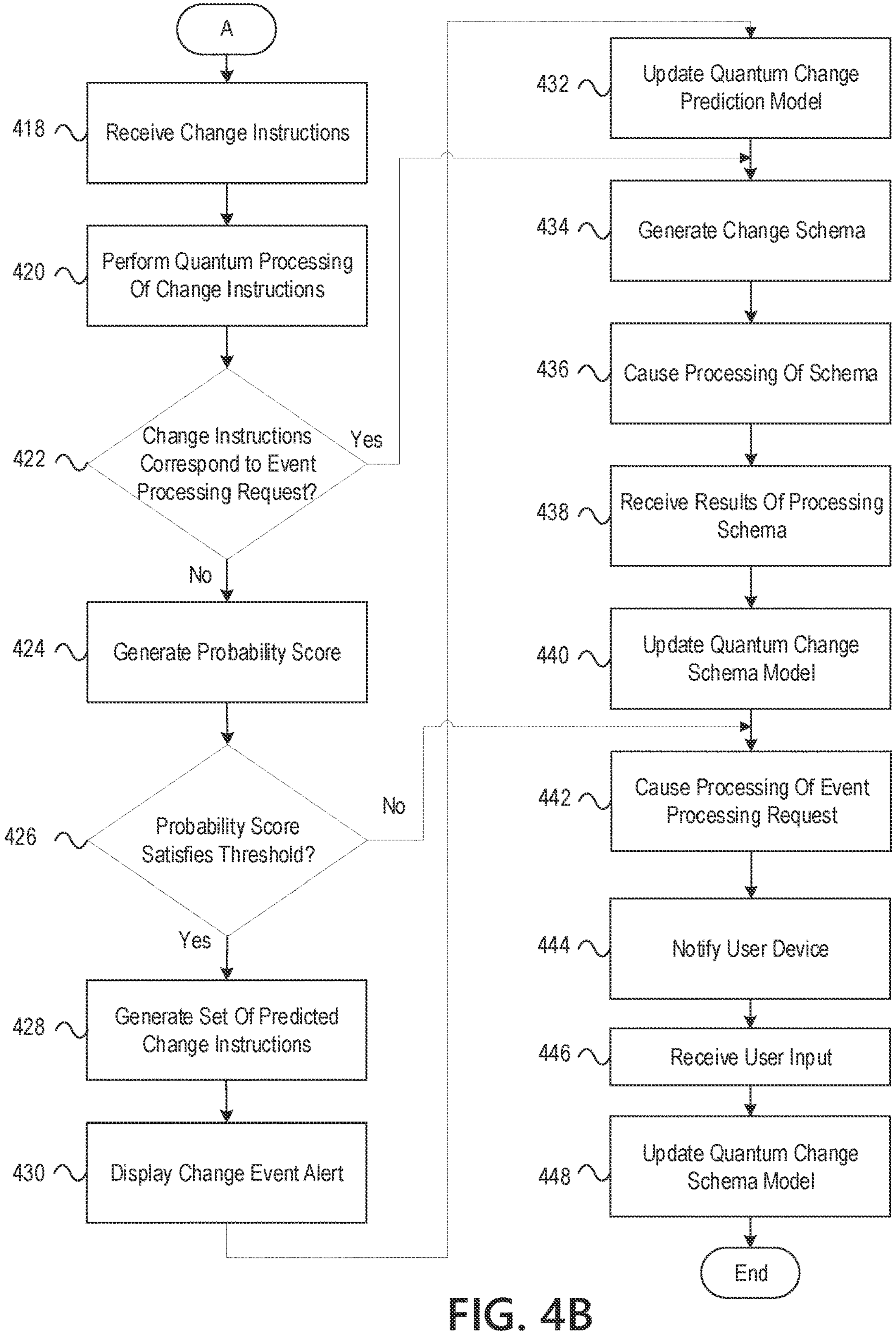

FIGS. 4A-4B depict an illustrative method for implementing a change prediction platform using quantum neural networks in accordance with one or more example arrangements. Referring to FIG. 4A, at step 402, a computing platform having at least one processor, a communication interface, and memory may retrieve historical event processing requests (e.g., from an event processing system, or the like). At step 404, the computing platform may encode the historical event processing requests (e.g., using quantum amplitude encoding, or the like). At step 406, the computing platform may retrieve historical change instructions (e.g., from an event processing system, or the like). At step 408, the computing platform may perform quantum processing of the historical change instructions. In some instances, steps 402-404 may occur simultaneously or near-simultaneously with steps 406-408. At step 410, the computing platform may train a quantum change schema model to generate change schema for event processing requests. At step 412, the computing platform may train a quantum change prediction model to generate probability scores and sets of predicted change instructions for event processing requests. At step 414, the computing platform may receive an event processing request. At step 416, the computing platform may encode the event processing request (e.g., using quantum amplitude encoding, or the like).

Referring to FIG. 4B, at step 418, the computing platform may receive change instructions. In some instances, the computing platform may receive the change instructions from the event processing system 106 in multiple sets over a period of time. At step 420, the computing platform may perform quantum processing of the change instructions. At step 422, the computing platform may determine whether any of the received and processed change instructions correspond to the event processing request received at step 414. The computing platform may determine whether there are any change instructions associated with the event processing request and/or whether a quantity of change instructions associated with the event processing request satisfies a threshold, using the quantum change schema model. Based on determining that there are change instructions associated with the event processing request and/or that the quantity of change instructions associated with the event processing request satisfies the threshold, the computing platform may proceed to step 434 and generate a change schema. Based on determining that there are no change instructions associated with the event processing request, the computing platform may proceed to step 424 and generate a probability score for the event processing request. At step 424, based on determining that there are no change instructions associated with the event processing request and/or that the quantity of change instructions associated with the event processing request does not satisfy a threshold, the computing platform may generate a probability score for the event processing request using the quantum change prediction model. At step 426, the computing platform may determine whether the probability score satisfies a threshold score by comparing the probability score to the threshold score. Based on determining that the probability score does not satisfy the threshold score, the computing platform may proceed to step 442 and cause processing of the event processing request. Based on determining that the probability score does satisfy the threshold score, the computing platform may proceed to step 428 and generate a set of predicted change instructions for the event processing request.

At step 428, based on determining that the probability score satisfies the threshold score, the computing platform may generate a set of predicted change instructions for the event processing request using the quantum change prediction model. At step 430, the computing platform may cause display of a change event alert. At step 432, the computing platform may update the quantum change prediction model based on the probability score, the set of predicted change instructions, and/or user input received based on displaying the change event alert. At step 434, the computing platform may generate a change schema for the event processing request using the quantum change schema model. At step 436, the computing platform may cause processing of the change schema. At step 438, the computing platform may receive the results of processing the change schema. At step 440, the computing platform may update the quantum change schema model based on the results of processing the change schema. At step 442, the computing platform may cause processing of the event processing request. At step 444, the computing platform may notify a user device that the event processing request was processed. At step 446, the computing platform may receive user input from the user device. At step 448, the computing platform may update the quantum change schema model based on the user input.

One or more aspects of the disclosure may be embodied in computer-usable information or computer-executable instructions, such as in one or more program modules, executed by one or more computers or other devices to perform the operations described herein. Generally, program modules include routines, programs, objects, components, information structures, and the like that perform particular tasks or implement particular abstract information types when executed by one or more processors in a computer or other information processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular information structures may be used to more effectively implement one or more aspects of the disclosure, and such information structures are contemplated to be within the scope of computer executable instructions and computer-usable information described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing information or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to information being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to information being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

retrieve, from an event processing system, a plurality of historical event processing requests and a plurality of historical change instructions;

encode the plurality of historical event processing requests using quantum encoding;

process, using natural language processing, the plurality of historical change instructions;

train a quantum change schema model based on the encoded plurality of historical event processing requests and based on the processed plurality of historical change instructions, wherein training the quantum change schema model configures the quantum change schema model to output change schema identifying one or more parameters for processing event processing requests;

receive a first event processing request from a user device;

encode the first event processing request using quantum encoding;

receive one or more change instructions from the event processing system;

process, using natural language processing, the one or more change instructions;

determine, by inputting the encoded first event processing request and the one or more change instructions into the quantum change schema model, whether the first event processing request is associated with a quantity of change instructions, of the one or more change instructions, that satisfies a threshold quantity of change instructions;

input, based on determining that the first event processing request is associated with a quantity of change instructions that satisfies the threshold quantity of change instructions, the first event processing request into a quantum change prediction model, wherein the quantum change prediction model is configured to output probability scores and sets of predicted change instructions for event processing requests, and wherein a given probability score indicates a likelihood that a change instruction should be applied to a given event processing request;

generate, based on inputting the first event processing request into the quantum change prediction model, a set of predicted change instructions for the first event processing request;

generate, by inputting the encoded first event processing request, the set of predicted change instructions, and the processed one or more change instructions into the quantum change schema model, a change schema for the first event processing request, wherein the change schema identifies one or more parameters for processing the first event processing request based on the one or more change instructions;

cause a microservice system to process the change schema, wherein causing the microservice system to process the change schema causes the microservice system to implement one or more changes to the first event processing request based on the change schema;

receive one or more indications of results of processing the change schema;

update the quantum change schema model based on the one or more indications; and cause, based on the change schema for the first event processing request, the event processing system to process the first event processing request.

2. The computing platform of claim 1, wherein causing the microservice system to process the change schema causes broadcasting, by the microservice system and to one or more devices associated with the event processing system, of one or more notifications indicating the one or more parameters.

3. The computing platform of claim 1, wherein encoding the first event processing request and encoding the plurality of historical event processing requests each comprises encoding event processing information into one or more amplitudes of a quantum state.

4. The computing platform of claim 1, wherein the one or more indications of results of processing the change schema comprise user input associated with the change schema and providing instructions to update the quantum change schema model.

5. The computing platform of claim 1, wherein the memory stores additional instructions that, when executed by the at least one processor, cause the computing platform to:

generate, based on causing the event processing system to process the first event processing request, a notification comprising:

an indication that the first event processing request was processed; and the one or more parameters, identified by the change schema, for processing the first event processing request;

send, to the user device, the notification;

receive, based on sending the notification to the user device, one or more change instructions for one or more additional event processing requests; and update, based on the one or more change instructions, the quantum change schema model.

6. The computing platform of claim 1, wherein the one or more parameters for processing the first event processing request comprise one or more of:

a timeframe for processing the first event processing request, a final destination for routing the first event processing request, an intermediary destination for routing the first event processing request, or an application for processing the first event processing request.

7. The computing platform of claim 1, wherein the one or more indications of the results of processing the change schema comprise one or more of:

an indication of whether an application identified by the change schema satisfies a parameter of the first event processing request, an indication of whether a destination, identified by the change schema, satisfies a parameter of the first event processing request, or an indication of whether a timeframe, identified by the change schema and for processing the first event processing request, satisfies a parameter of the first event processing request.

8. A method comprising:

at a computing device comprising at least one processor, a communication interface, and memory:

retrieving, from an event processing system, a plurality of historical event processing requests and a plurality of historical change instructions;

encoding the plurality of historical event processing requests using quantum encoding;

processing, using natural language processing, the plurality of historical change instructions;

training a quantum change schema model based on the encoded plurality of historical event processing requests and based on the processed plurality of historical change instructions, wherein training the quantum change schema model configures the quantum change schema model to output change schema identifying one or more parameters for processing event processing requests;

receiving a first event processing request from a user device;

encoding the first event processing request using quantum encoding;

receiving one or more change instructions from the event processing system;

processing, using natural language processing, the one or more change instructions;

determining, by inputting the encoded first event processing request and the one or more change instructions into the quantum change schema model, whether the first event processing request is associated with a quantity of change instructions, of the one or more change instructions, that satisfies a threshold quantity of change instructions;

inputting, based on determining that the first event processing request is associated with a quantity of change instructions that satisfies the threshold quantity of change instructions, the first event processing request into a quantum change prediction model, wherein the quantum change prediction model is configured to output probability scores and sets of predicted change instructions for event processing requests, and wherein a given probability score indicates a likelihood that a change instruction should be applied to a given event processing request;

generating, based on inputting the first event processing request into the quantum change prediction model, a set of predicted change instructions for the first event processing request;

generating, by inputting the encoded first event processing request, the set of predicted change instructions, and the processed one or more change instructions into the quantum change schema model, a change schema for the first event processing request, wherein the change schema identifies one or more parameters for processing the first event processing request based on the one or more change instructions;

causing a microservice system to process the change schema, wherein causing the microservice system to process the change schema causes the microservice system to implement one or more changes to the first event processing request based on the change schema;

receiving one or more indications of results of processing the change schema;

updating the quantum change schema model based on the one or more indications; and causing, based on the change schema for the first event processing request, the event processing system to process the first event processing request.

9. The method of claim 8, wherein causing the microservice system to process the change schema causes broadcasting, by the microservice system and to one or more devices associated with the event processing system, of one or more notifications indicating the one or more parameters.

10. The method of claim 8, wherein encoding the first event processing request and encoding the plurality of historical event processing requests each comprises encoding event processing information into one or more amplitudes of a quantum state.

11. The method of claim 8, wherein the one or more indications of results of processing the change schema comprise user input associated with the change schema and providing instructions to update the quantum change schema model.

12. The method of claim 8, further comprising, at the computing device:

generating, based on causing the event processing system to process the first event processing request, a notification comprising:

an indication that the first event processing request was processed; and the one or more parameters, identified by the change schema, for processing the first event processing request;

sending, to the user device, the notification;

receiving, based on sending the notification to the user device, one or more change instructions for one or more additional event processing requests; and updating, based on the one or more change instructions, the quantum change schema model.

13. The method of claim 8, wherein the one or more parameters for processing the first event processing request comprise one or more of:

a timeframe for processing the first event processing request, a final destination for routing the first event processing request, an intermediary destination for routing the first event processing request, or an application for processing the first event processing request.

14. The method of claim 8, wherein the one or more indications of the results of processing the change schema comprise one or more of:

an indication of whether an application identified by the change schema satisfies a parameter of the first event processing request, an indication of whether a destination, identified by the change schema, satisfies a parameter of the first event processing request, or an indication of whether a timeframe, identified by the change schema and for processing the first event processing request, satisfies a parameter of the first event processing request.

15. One or more non-transitory computer-readable media storing instructions that, when executed by a computing platform comprising at least one processor, a communication interface, and memory, cause the computing platform to:

retrieve, from an event processing system, a plurality of historical event processing requests and a plurality of historical change instructions;

encode the plurality of historical event processing requests using quantum encoding;

process, using natural language processing, the plurality of historical change instructions;

train a quantum change schema model based on the encoded plurality of historical event processing requests and based on the processed plurality of historical change instructions, wherein training the quantum change schema model configures the quantum change schema model to output change schema identifying one or more parameters for processing event processing requests;

receive a first event processing request from a user device;

encode the first event processing request using quantum encoding;

receive one or more change instructions from the event processing system;

process, using natural language processing, the one or more change instructions;

determine, by inputting the encoded first event processing request and the one or more change instructions into the quantum change schema model, whether the first event processing request is associated with a quantity of change instructions, of the one or more change instructions, that satisfies a threshold quantity of change instructions;

input, based on determining that the first event processing request is associated with a quantity of change instructions that satisfies the threshold quantity of change instructions, the first event processing request into a quantum change prediction model, wherein the quantum change prediction model is configured to output probability scores and sets of predicted change instructions for event processing requests, and wherein a given probability score indicates a likelihood that a change instruction should be applied to a given event processing request;

generate, based on inputting the first event processing request into the quantum change prediction model, a set of predicted change instructions for the first event processing request;

generate, by inputting the encoded first event processing request, the set of predicted change instructions, and the processed one or more change instructions into the quantum change schema model, a change schema for the first event processing request, wherein the change schema identifies one or more parameters for processing the first event processing request based on the one or more change instructions;

cause a microservice system to process the change schema, wherein causing the microservice system to process the change schema causes the microservice system to implement one or more changes to the first event processing request based on the change schema;

receive one or more indications of results of processing the change schema;

update the quantum change schema model based on the one or more indications; and cause, based on the change schema for the first event processing request, the event processing system to process the first event processing request.

16. The one or more non-transitory computer-readable media of claim 15, wherein causing the microservice system to process the change schema causes broadcasting, by the microservice system and to one or more devices associated with the event processing system, of one or more notifications indicating the one or more parameters.

17. The one or more non-transitory computer-readable media of claim 15, wherein encoding the first event processing request and encoding the plurality of historical event processing requests each comprises encoding event processing information into one or more amplitudes of a quantum state.

18. The one or more non-transitory computer-readable media of claim 15, wherein the one or more indications of results of processing the change schema comprise user input associated with the change schema and providing instructions to update the quantum change schema model.

19. The one or more non-transitory computer-readable media of claim 15, storing instructions that, when executed, further cause the computing platform to:

generate, based on causing the event processing system to process the first event processing request, a notification comprising:

an indication that the first event processing request was processed; and the one or more parameters, identified by the change schema, for processing the first event processing request;

send, to the user device, the notification;

receive, based on sending the notification to the user device, one or more change instructions for one or more additional event processing requests; and update, based on the one or more change instructions, the quantum change schema model.

20. The one or more non-transitory computer-readable media of claim 15, wherein the one or more parameters for processing the first event processing request comprise one or more of:

a timeframe for processing the first event processing request, a final destination for routing the first event processing request, an intermediary destination for routing the first event processing request, or an application for processing the first event processing request.

* * * * *